(12) United States Patent
Hull et al.

(10) Patent No.: US 7,415,670 B2
(45) Date of Patent: Aug. 19, 2008

(54) PRINTER WITH AUDIO/VIDEO LOCALIZATION

(75) Inventors: Jonathan J. Hull, San Carlos, CA (US); Berna Erol, Cupertino, CA (US); Peter E. Hart, Menlo Park, CA (US)

(73) Assignee: Ricoh Co., Ltd., Minato-Ku, Tokyo (JP)

( * ) Notice: Subject to any disclaimer, the term of this patent is extended or adjusted under 35 U.S.C. 154(b) by 536 days.

(21) Appl. No.: 10/813,946

(22) Filed: Mar. 30, 2004

(65) Prior Publication Data

US 2005/0034057 A1 Feb. 10, 2005

Related U.S. Application Data

(63) Continuation-in-part of application No. 10/001,895, filed on Nov. 19, 2001, now Pat. No. 7,263,659, and a continuation-in-part of application No. 10/001,849, filed on Nov. 19, 2001, now Pat. No. 7,263,671, and a continuation-in-part of application No. 10/001,893, filed on Nov. 19, 2001, now Pat. No. 7,266,782, and a continuation-in-part of application No. 10/001,894, filed on Nov. 19, 2001, now Pat. No. 7,149,957, and a continuation-in-part of application No. 10/001,891, filed on Nov. 19, 2001.

(60) Provisional application No. 60/506,303, filed on Sep. 25, 2003, provisional application No. 60/506,302, filed on Sep. 25, 2003.

(51) Int. Cl.
*G06F 3/00* (2006.01)
*G06F 3/14* (2006.01)

(52) U.S. Cl. .................. 715/716; 715/719; 715/838; 715/201; 358/1.1; 358/1.18; 358/530; 382/173

(58) Field of Classification Search .............. 715/500, 715/500.1, 501.1, 513, 517, 523, 526, 700, 715/726, 717, 719, 727, 764, 835, 838, 839, 715/855, 978, 200–203, 205, 234, 276; 358/1.1, 358/1.15, 1.18, 530, 540; 382/173; 705/55
See application file for complete search history.

(56) References Cited

U.S. PATENT DOCUMENTS 4,133,007 A 1/1979 Wessler et al.

(Continued)

FOREIGN PATENT DOCUMENTS

CN 1352765 A 6/2002

(Continued)

OTHER PUBLICATIONS

ASCII 24.com, [online] (date unknown), Retrieved from the Internet<URL: http://216.239.37.104/search?q=cache:z-G9M1EpvSUJ:ascii24.com/news/i/hard/article/1998/10/01/612952-000.html+%E3%82%B9%E3% . . .>.

(Continued)

*Primary Examiner*—X. L Bautista
(74) *Attorney, Agent, or Firm*—Fenwick & West LLP

(57) ABSTRACT

A multimedia printing device receives multimedia data, processes it, and outputs it, thereby enhancing the handling and use of such data. In an embodiment, the processed data are output in a variety of formats, including on video paper, through a multimedia broadcast, or a bar code pointer to a digital archive. In another embodiment, the multimedia printing device receives multimedia data and uses the data to perform multimedia and video localization on the peripheral devices that generate the multimedia data. In another embodiment, the multimedia printing device carries out commands to capture and process multimedia data, including by inserting multimedia objects into existing documents.

38 Claims, 11 Drawing Sheets

U.S. PATENT DOCUMENTS

| | | | |
|---|---|---|---|
| 4,205,780 A | 6/1980 | Burns et al. |
| 4,619,522 A | 10/1986 | Imai |
| 4,635,132 A | 1/1987 | Nakamura |
| 4,734,898 A | 3/1988 | Morinaga |
| 4,754,485 A | 6/1988 | Klatt |
| 4,807,186 A | 2/1989 | Ohnishi et al. |
| 4,831,610 A | 5/1989 | Hoda et al. |
| 4,881,135 A | 11/1989 | Heilweil |
| 4,907,973 A | 3/1990 | Hon |
| 4,998,215 A | 3/1991 | Black et al. |
| 5,091,948 A | 2/1992 | Kametani |
| 5,093,730 A | 3/1992 | Ishii et al. |
| 5,115,967 A | 5/1992 | Wedekind |
| 5,136,563 A | 8/1992 | Takemasa et al. |
| 5,170,935 A | 12/1992 | Federspiel et al. |
| 5,270,989 A | 12/1993 | Kimura |
| 5,386,510 A | 1/1995 | Jacobs |
| 5,432,532 A | 7/1995 | Mochimaru et al. |
| 5,436,792 A | 7/1995 | Leman et al. |
| 5,438,426 A | 8/1995 | Miake et al. |
| 5,444,476 A | 8/1995 | Conway |
| 5,485,554 A | 1/1996 | Lowitz et al. |
| 5,493,409 A | 2/1996 | Maeda et al. |
| 5,568,406 A | 10/1996 | Gerber |
| 5,576,950 A * | 11/1996 | Tonomura et al. ............ 386/121 |
| 5,617,138 A | 4/1997 | Ito et al. |
| 5,633,723 A | 5/1997 | Sugiyama et al. |
| 5,661,783 A | 8/1997 | Assis |
| 5,682,330 A | 10/1997 | Seaman et al. |
| 5,690,496 A | 11/1997 | Kennedy |
| 5,721,883 A | 2/1998 | Katsuo et al. |
| 5,729,665 A | 3/1998 | Gauthier |
| 5,764,368 A | 6/1998 | Shibaki et al. |
| 5,774,260 A | 6/1998 | Petitto et al. |
| 5,884,056 A | 3/1999 | Steele |
| 5,903,538 A | 5/1999 | Fujita et al. |
| 5,936,542 A | 8/1999 | Kleinrock et al. |
| 5,940,776 A | 8/1999 | Baron et al. |
| 5,987,226 A | 11/1999 | Ishikawa et al. |
| 6,000,030 A | 12/1999 | Steinberg et al. |
| 6,038,567 A * | 3/2000 | Young ..................... 707/103 R |
| 6,043,904 A | 3/2000 | Nickerson |
| 6,106,457 A | 8/2000 | Perkins et al. |
| 6,115,718 A | 9/2000 | Huberman et al. |
| 6,118,888 A | 9/2000 | Chino et al. |
| 6,123,258 A | 9/2000 | Iida |
| 6,138,151 A | 10/2000 | Reber et al. |
| 6,153,667 A | 11/2000 | Howald |
| 6,167,033 A | 12/2000 | Chang et al. |
| 6,170,007 B1 | 1/2001 | Venkatraman et al. |
| 6,175,489 B1 | 1/2001 | Markow et al. |
| 6,189,009 B1 | 2/2001 | Stratigos et al. |
| 6,193,658 B1 | 2/2001 | Wendelken et al. |
| 6,296,693 B1 | 10/2001 | McCarthy |
| 6,297,851 B1 | 10/2001 | Taubman et al. |
| 6,298,145 B1 | 10/2001 | Zhang et al. |
| 6,302,527 B1 | 10/2001 | Walker |
| 6,308,887 B1 | 10/2001 | Korman et al. |
| 6,373,498 B1 | 4/2002 | Abgrall |
| 6,373,585 B1 | 4/2002 | Mastie et al. |
| 6,375,298 B2 | 4/2002 | Purcell et al. |
| 6,378,070 B1 | 4/2002 | Chan et al. |
| 6,417,435 B2 | 7/2002 | Chantzis et al. |
| 6,421,738 B1 | 7/2002 | Ratan et al. |
| 6,439,465 B1 | 8/2002 | Bloomberg |
| 6,442,336 B1 | 8/2002 | Lemelson |
| 6,452,615 B1 | 9/2002 | Chiu et al. |
| 6,466,534 B2 | 10/2002 | Cundiff, Sr. |
| 6,476,793 B1 | 11/2002 | Motoyama et al. |
| D468,277 S | 1/2003 | Sugiyama |
| 6,504,620 B1 * | 1/2003 | Kinjo ..................... 358/1.15 |
| 6,519,360 B1 | 2/2003 | Tanaka |
| 6,529,920 B1 | 3/2003 | Arons et al. |
| 6,535,639 B1 | 3/2003 | Uchihachi et al. |
| 6,544,294 B1 * | 4/2003 | Greenfield et al. .......... 715/234 |
| 6,552,743 B1 | 4/2003 | Rissman |
| 6,594,377 B1 | 7/2003 | Kim et al. |
| 6,611,276 B1 | 8/2003 | Muratori et al. |
| 6,611,622 B1 | 8/2003 | Krumm |
| 6,611,628 B1 | 8/2003 | Sekiguchi et al. |
| 6,647,535 B1 | 11/2003 | Bozdagi et al. |
| 6,665,092 B2 | 12/2003 | Reed |
| 6,674,538 B2 | 1/2004 | Takahashi |
| 6,678,389 B1 | 1/2004 | Sun et al. |
| 6,687,383 B1 | 2/2004 | Kanevsky et al. |
| 6,700,566 B2 | 3/2004 | Shimoosawa et al. |
| 6,724,494 B1 | 4/2004 | Danknick |
| 6,728,466 B1 * | 4/2004 | Tanaka ..................... 386/46 |
| 6,750,978 B1 | 6/2004 | Marggraff et al. |
| 6,774,951 B2 | 8/2004 | Narushima |
| 6,775,651 B1 | 8/2004 | Lewis et al. |
| 6,807,303 B1 | 10/2004 | Kim et al. |
| 6,824,044 B1 | 11/2004 | Lapstun et al. |
| 6,853,980 B1 | 2/2005 | Ying et al. |
| 6,856,415 B1 | 2/2005 | Simchik et al. |
| 6,892,193 B2 | 5/2005 | Bolle et al. |
| 6,904,168 B1 | 6/2005 | Steinberg et al. |
| 6,938,202 B1 | 8/2005 | Matsubayashi et al. |
| 6,964,374 B1 | 11/2005 | Djuknic et al. |
| 6,983,482 B2 | 1/2006 | Morita et al. |
| 7,000,193 B1 | 2/2006 | Impink, Jr. et al. |
| 7,023,459 B2 | 4/2006 | Arndt et al. |
| 7,031,965 B1 | 4/2006 | Moriya et al. |
| 7,075,676 B2 | 7/2006 | Owen |
| 7,092,568 B2 | 8/2006 | Eaton |
| 7,131,058 B1 | 10/2006 | Lapstun |
| 7,196,808 B2 | 3/2007 | Kofman et al. |
| 2001/0003846 A1 | 6/2001 | Rowe et al. |
| 2001/0017714 A1 | 8/2001 | Komatsu et al. |
| 2001/0037408 A1 | 11/2001 | Thrift et al. |
| 2001/0052942 A1 | 12/2001 | MacCollum et al. |
| 2002/0001101 A1 | 1/2002 | Hamura et al. |
| 2002/0004807 A1 | 1/2002 | Graham et al. |
| 2002/0006100 A1 | 1/2002 | Cundiff, Sr. et al. |
| 2002/0010641 A1 | 1/2002 | Stevens et al. |
| 2002/0015066 A1 | 2/2002 | Siwinski et al. |
| 2002/0048224 A1 | 4/2002 | Dygert et al. |
| 2002/0051010 A1 | 5/2002 | Jun et al. |
| 2002/0060748 A1 | 5/2002 | Aratani et al. |
| 2002/0067503 A1 | 6/2002 | Hiatt |
| 2002/0099534 A1 | 7/2002 | Hegarty |
| 2002/0101513 A1 | 8/2002 | Halverson |
| 2002/0131071 A1 | 9/2002 | Parry |
| 2002/0135800 A1 | 9/2002 | Dutta |
| 2002/0140993 A1 | 10/2002 | Silverbrook |
| 2002/0159637 A1 | 10/2002 | Echigo et al. |
| 2002/0169849 A1 | 11/2002 | Schroath |
| 2002/0171857 A1 | 11/2002 | Hisatomi et al. |
| 2002/0185533 A1 | 12/2002 | Shieh et al. |
| 2002/0199149 A1 | 12/2002 | Nagasaki et al. |
| 2003/0002068 A1 | 1/2003 | Constantin et al. |
| 2003/0007776 A1 | 1/2003 | Kameyama et al. |
| 2003/0038971 A1 | 2/2003 | Renda |
| 2003/0051214 A1 | 3/2003 | Graham et al. |
| 2003/0076521 A1 * | 4/2003 | Li et al. ..................... 358/1.13 |
| 2003/0084462 A1 | 5/2003 | Kubota et al. |
| 2003/0088582 A1 | 5/2003 | Pflug |
| 2003/0093384 A1 | 5/2003 | Durst et al. |
| 2003/0110926 A1 | 6/2003 | Sitrick et al. |
| 2003/0117652 A1 | 6/2003 | Lapstun |
| 2003/0121006 A1 | 6/2003 | Tabata et al. |
| 2003/0160898 A1 | 8/2003 | Baek et al. |
| 2003/0220988 A1 | 11/2003 | Hymel |
| 2004/0044894 A1 | 3/2004 | Lofgren et al. |

| | | | |
|---|---|---|---|
| 2004/0125402 | A1 | 7/2004 | Kanai et al. |
| 2004/0128613 | A1 | 7/2004 | Sinisi |
| 2004/0143602 | A1 | 7/2004 | Ruiz et al. |
| 2004/0156616 | A1* | 8/2004 | Strub et al. .................. 386/46 |
| 2004/0240541 | A1 | 12/2004 | Chadwick et al. |
| 2004/0249650 | A1 | 12/2004 | Freedman et al. |
| 2005/0064935 | A1 | 3/2005 | Blanco |
| 2007/0033419 | A1 | 2/2007 | Kocher et al. |

FOREIGN PATENT DOCUMENTS

| | | |
|---|---|---|
| CN | 1097394 C | 12/2002 |
| EP | 1133170 A2 | 9/2001 |

OTHER PUBLICATIONS

Configuring A Printer (NT), Oxford Computer Support [online] [Retrieved on Nov. 13, 2003] Retrieved from the Internet<URL: http://www.nox.ac.uk/cehoxford/ccs/facilities/printers/confignt.htm>.

"DocumentMall Secure Document Management" [online] Retrieved on Mar. 9, 2004). Retrieved from the Internet <URL: http://www.documentmall.com>.

Girgensohn, Andreas et al., "Time-Constrained Keyframe Selection Technique," Multimedia Tools and Applications (2000), vol. 11, pp. 347-358.

Graham, Jamey et al., "A Paper-Based Interface for Video Browsing and Retrieval," IEEE International Conference on Multimedia and Expo (Jul. 6-9, 2003), vol. 2, P:II 749-752.

Graham, Jamey et al., "The Video Paper Multimedia Playback System," Proceedings of the 11th ACM International Conference on Multimedia (Nov. 2003), pp. 94-95.

Graham, Jamey et al., "Video Paper: A Paper-Based Interface for Skimming and Watching Video," International Conference on Consumer Electronics (Jun. 16-18, 2002), pp. 214-215.

Hull, Jonathan J. et al., "Visualizing Multimedia Content on Paper Documents: Components of Key Frame Selection for Video Paper," Proceedings of the 7th International Conference on Document Analysis and Recognition (2003), vol. 1, pp. 389-392.

"Kofax: Ascent Capture: Overview" [online] [Retrieved on Jan. 22, 2004]. Retrieved form the Internet: <URL http://www.kofax.com/products/ascent/capture>.

Label Producer by Maxell, [online] [Retrieved on Nov. 11, 2003]. Retrieved from the Internet<URL: http://www.maxell.co.jp/products/consumer/rabel_card/>.

Movie-PhotoPrint by Canon, [online] [Retrieved on Nov. 11, 2003]. Retrieved from the Internet<URL: http://cweb.canon.jp/hps/guide/rimless.html>.

PostScript Language Document Structuring Conventions Specification, Version 3.0 (Sep. 25, 1992), Adobe Systems Incorporated.

Print From Cellular Phone by Canon, [online] [Retrieved on Nov. 11, 2003]. Retrieved from the Internet<URL: http://cweb.canon.jp/bj/enjoy/pbeam/index.html>.

Print Images Plus Barcode by Fuji Xerox, [online] [Retrieved on Nov. 11, 2003]. Retrieved from the Internet<URL: http://www.fujixerox.co.jp/soft/cardgear/release.html>.

Print Scan-Talk By Barcode by Epson, [online] [Retrieved on Nov. 11, 2003]. Retrieved from the Internet<URL: http://www.epson.co.jp/osirase/2000/000217.htm>.

Printer With CD/DVD Tray, Print CD/DVD Label by Epson, [online] [Retrieved on Nov. 11, 2003]. Retrieved from the Internet<URL: http://www.i-love-epson.co.jp/products/printer/inkjet/pmd750/pmd7503.htm>.

R200 ScanTalk [online] (date unknown). Retrieved from the Internet<URL: http://homepage2.nifty.com/vascolza/ScanTalk.htm>, retrieved on Mar. 30, 2004.

Variety of Media In, Print Paper Out by Epson, [online] [Retrieved on Nov. 11, 2003]. Retrieved from the Internet<URL: http://www.i-love-epson.co.jp/products/spc/pma850/pma8503.htm>.

Gopal, S. et al., "Load Balancing in a Heterogeneous Computing Environment," Proceedings of the Thirty-First Hawaii International Conference on System Sciences, Jan. 6-9, 1998.

Gropp, W. et al., "Using MPI—Portable Programming with the Message-Passing Interface," copyright 1999, pp. 35-42, second edition, MIT Press.

"Seiko Instruments USA, Inc.—Business and Home Office Products" online, date unknown, Seiko Instruments USA, Inc., [retrieved on Jan. 25, 2005]. Retrieved from the Internet: <URL: http://www.siibusinessproducts.com/products/link-ir-p-html>.

"Tasty FotoArt" [online], date unknown, Tague Technologies, Inc., [retrieved on Mar. 8, 2005]. Retrieved from the Internet: <URL: http//www.tastyfotoart.com>.

Gropp, W. et al., "Using MPI-Portable Programming with the Message Passing Interface," copyright 1999, pp. 35-42, second edition, MIT Press.

Poon, K.M. et al., "Performance Analysis of Median Filtering on Meiko™—A Distributed Multiprocessor System," IEEE First International Conference on Algorithms and Architectures for Parallel Processing, 1995, pp. 631-639.

Lamming, M. et al., "Using Automatically Generated Descriptions of Human Activity to Index Multi-media Data," IEEE Multimedia Communications and Applications IEE Colloquium, Feb. 7, 1991, pp. 5/1-5/3.

Communication Pursuant to Article 96(2) EPC, European Application No. 04255836.1, Jun. 11, 2007, 10 pages.

Stifelman, L. et al., "The Audio Notebook," SIGCHI 2001, Mar. 31-Apr. 5, 2001, pp. 182-189, vol. 3, No. 1, Seattle, WA.

R200 ScanTalk [online] (date unknown). Retrieved from the Internet<URL: http://homepage2nifty.com/vasolza/ScanTalk.htm>.

Dimitrova, N. et al., "Applications of Video-Content Analysis and Retrieval," IEEE Multimedia, Jul.-Sep. 2002, pp. 42-55.

European Search Report, EP 04255836, Sep. 12, 2006, 4 pages.
European Search Report, EP 04255837, Sep. 5, 2006, 3 pages.
European Search Report, EP 04255839, Sep. 4, 2006, 3 pages.
European Search Report, EP 04255840, Sep. 12, 2006, 3 pages.

Graham, J. et al., "A Paper-Based Interface for Video Browsing and Retrieval," ICME '03, Jul. 6-9, 2003, pp. 749-752, vol. 2.

Graham, J. et al., "Video Paper: A Paper-Based Interface for Skimming and Watching Video," ICCE '02, Jun. 18-20, 2002, pp. 214-215.

Klemmer, S.R. et al., "Books With Voices: Paper Transcripts as a Tangible Interface to Oral Histories," CHI Letters, Apr. 5-10, 2003, pp. 89-96, vol. 5, Issue 1.

Minami, K. et al., "Video Handling with Music and Speech Detection," IEEE Multimedia, Juy-Sep. 1998, pp. 17-25.

Shahraray, B. et al, "Automated Authoring of Hypermedia Documents of Video Programs," ACM Multimedia '95 Electronic Proceedings, San Francisco, CA, Nov. 5-9, 1995, pp. 1-12.

Shahraray, B. et al., "Pictorial Transcripts: Multimedia Processing Applied to Digital Library Creation," IEEE, 1997, pp. 581-586.

Chinese Application No. 2004100849823 Office Action, Jun. 1, 2007, 24 pages.

Chinese Application No. 2004100897988 Office Action, Apr. 6, 2007, 8 pages.

* cited by examiner

PRINTER WITH AUDIO/VIDEO LOCALIZATION

CROSS REFERENCE TO RELATED APPLICATIONS

The present application claims the benefit of U.S. Provisional Patent Application Ser. No. 60/506,303 filed Sep. 25, 2003, entitled "Printer Including One or More Specialized Hardware Devices," and U.S. Provisional Patent Application 60/506,302 filed on Sep. 25, 2003, entitled "Printer Including Interface and Specialized Information Processing Capabilities," each of which is hereby incorporated by reference in its entirety.

The present application is a continuation-in-part of the following co-pending U.S Patent Applications: application Ser. No. 10/001,895, "(Video Paper) Paper-based Interface for Multimedia Information," filed Nov. 19, 2001 now U.S. Pat. No. 7,263,659; application Ser. No. 10/001,849, "(Video Paper) Techniques for Annotating Multimedia Information," filed Nov. 19, 2001 now U.S. Pat. No. 7,263,671; application Ser. No. 10/001,893, "(Video Paper) Techniques for Generating a Coversheet for a paper-based Interface for Multimedia Information," filed Nov. 19, 2001 now U.S. Pat. No. 7,266,782; application Ser. No. 10/001,894, "(Video Paper) Techniques for Retrieving Multimedia Information Using a Paper-Based Interface," filed Nov. 19, 2001 now U.S. Pat. No. 7,149,957; application Ser. No. 10/001,891, "(Video Paper) Paper-based Interface for Multimedia Information Stored by Multiple Multimedia Documents," filed Nov. 19, 2001; application Ser. No. 10/175,540, "(Video Paper) Device for Generating a Multimedia Paper Document," filed Jun. 18, 2002; and application Ser. No. 10/645,821, "(Video Paper) Paper-Based Interface for Specifying Ranges CIP," filed Aug. 20, 2003; each of which is each hereby incorporated by reference in its entirety.

The present application is related to the following U.S Patent Applications: "Printer With Embedded Retrieval and Publishing Interface," to Hull et. al, filed Mar. 30, 2004, Ser. No. 10/814,536; "Printer With Document-Triggered Processing," to Hull et. al, filed Mar. 30, 2004, Ser. No. 10/814,580; "Printer User Interface," to Hart et. al, filed Mar. 30, 2004, Ser. No. 10/814,700; "User Interface for Networked Printer," to Hart et. al, filed Mar. 30, 2004, Ser. No. 10/814,500; "Multimedia Print Driver Dialog Interfaces," to Hull et. al, filed Mar. 30, 2004, Ser. No. 10/814,944; and application Ser. No. 10/754,907, and "Generating and Displaying Level-Of-Interest Values", filed Jan. 9, 2004; each of which is hereby incorporated by reference in its entirety.

BACKGROUND

1. Field of the Invention

The present invention relates to document printers and, more specifically, to document printers that can receive, process, and transform multimedia data, and output it in a different format.

2. Background of the Invention

Cost and quality improvements in multimedia technologies have led to a proliferation of monitoring devices and their applications. High-quality video cameras and microphones are becoming commonplace in the home and workplace, and have proven to be useful for diverse purposes ranging from teleconferencing to surveillance to work flow management. Multimedia data captured by such monitoring devices are typically delivered in an unprocessed form to a medium such as a digital tape, hard disk, or memory card. Typically, the user must then filter the data in order to isolate the useful elements—for instance, by editing out unwanted noise. Often the data will have to be further processed to create a usable record, for instance by isolating relevant events. The process of sifting through such data is often tedious and error-prone, requiring users to play, fast-forward, and rewind through voluminous stores of data. In the case of surveillance applications, in which the primary purpose of such applications is essentially to wait for certain events to occur, the time and resources spent carrying out the repeated steps of event detection can be considerable.

The processing of multimedia data to create a usable record typically involves several disparate steps, each potentially requiring considerable effort. Oftentimes a user will have to convert and transfer multimedia data in different stages to different devices—for instance from an analog tape to an unprocessed digital file, then into a summary file containing excerpts of the data, then to a memory or output device. While the processing of a multimedia files commonly involves the same repeated tasks—for instance, making an multimedia recording of a meeting, filtering out the noise, adding participant and other identifier information, and then sending the processed multimedia record to the meeting attendants—there is no easy way to automate them. In addition, because the data are typically not printed to a paper document, they are difficult to incorporate into the existing paper-based workflow by which most offices function. Although means do exist to map multimedia data to paper friendly outputs—for instance, to transcribe intelligible multimedia records to a dialog script or to extract images or frames from a video record—which then could be printed, these additional conversion steps are often not automated or performed.

Thus, there is a need for an integrated system that can receive multimedia data, process it, and deliver an output to a printed document or other media.

SUMMARY OF THE INVENTION

The present invention overcomes the deficiencies and limitations of the prior art by providing systems and apparati in which multimedia data are received by a multimedia processing device, the data are processed, and the result is output. It also provides apparati and methods of generating a control signal for a peripheral device based on data captured by the peripheral device (or another peripheral device) and received by a multimedia processing device. Finally, other embodiments of the invention are provided in which a multimedia processing device receives a command to process multimedia data and to perform an action responsive to the occurrence of a multimedia event and the command is executed if the event is detected.

DETAILED DESCRIPTION OF THE PREFERRED EMBODIMENTS

The present invention provides systems and methods for managing multimedia data from the capture of the data to its eventual output in a useful format. By combining monitoring, processing, and output capabilities, embodiments of the invention provide a unified solution to various monitoring, recording, and other needs. The integrated management of multimedia data that the present invention makes possible has several benefits—including enhancing the efficiency of multimedia monitoring and processing, reducing the number of steps it takes to extract useful information from multimedia data, and enabling greater integration of multimedia data into decision-making and analysis.

Figure 1A:
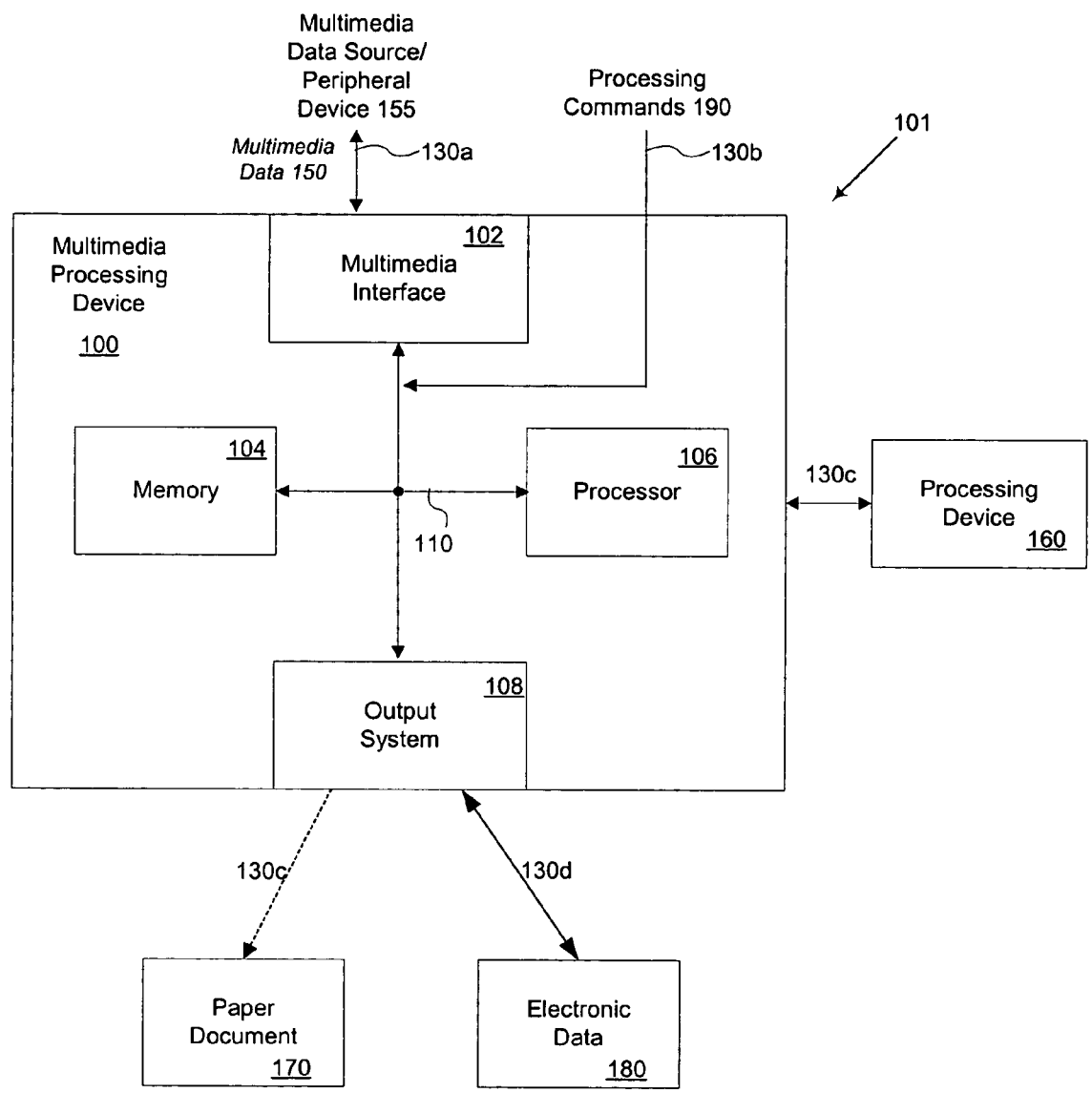
FIG. 1A is a block diagram of a printer with audio/video localization in accordance with an embodiment of the present invention.

FIG. 1A illustrates a preferred embodiment of a system 101 constructed in accordance with the present invention, and including: a multimedia data source including a peripheral device 155, a multimedia processing device 100, a processor 106, an electronic data storage or medium 180 and an exemplary output document 170. The multimedia processing device 100 is coupled to receive a video stream from the peripheral device 155, such as a video camera, by signal line 130. The multimedia processing device 100 is configured to detect certain events in the data stream based on an event profile supplied to the multimedia processing device 100. The multimedia processing device 100 can isolate these events to reduce the data stream captured by the video camera to a few relevant images or clips. The multimedia processing device 100 then outputs these to a paper or electronic document. Used in this way, the multimedia processing device 100 can provide a convenient and portable alternative to a user having to sift through reams of data looking for significant events.

For the purposes of this invention, the terms "multimedia data", "multimedia file", "multimedia information" or "multimedia content" include any one or combination of video data, audio data, graphics data, animation data, sensory data, still video, slides information, whiteboard images information, and other types of data. The data can be in analog form, stored on magnetic tape, or digital files that can be in a variety of formats including ASF, Divx, 3DO, .mmx, .sdmi, .mpeg, .smil, multimedia, .mp3, .wav, magnetic tape, digital audio tape, various MPEG formats (e.g., MPEG 1, MPEG 2, MPEG 4, MPEG 7, etc.), HTML+TIME, WMF (Windows Media Format), RM (Real Media), Quicktime, Shockwave, various streaming media formats, formats being developed by the engineering community, proprietary and customary formats, and others. In certain cases, multimedia data may also comprise files in other formats.

For purposes of the invention, the multimedia data discussed throughout the invention can be supplied to multimedia processing device 100 in any number of ways including in the form of streaming content, a live feed from a multimedia capture device, a discrete file, or as a portion of a larger file. In addition, for the purposes of this invention, the terms "print" or "printing," when referring to printing onto some type of medium, are intended to include printing, writing, drawing, imprinting, embossing, generating in digital format, and other types of generation of a data representation. While the words "document" and "paper" are referred to in these terms, output of the system 101 in the present invention is not limited to such a physical medium, like a paper medium. Instead, the above terms can refer to any output that is fixed in a tangible medium. In some embodiments, the output of the system 101 of the present invention can be a representation of multimedia data printed on a physical paper document. By generating a paper document, the present invention provides the portability of paper and provides a readable representation of the multimedia information.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" or the like means that a particular feature, structure, or characteristic described in connection with the embodiment is included in at least one embodiment of the invention. The appearances of "in one embodiment" and like phrases in various places in the specification are not necessarily all referring to the same embodiment.

Still referring to FIG. 1A, a block diagram shows the multimedia processing device or multimedia printer 100 in accordance with an embodiment of the invention. The multimedia processing device 100 preferably comprises an multimedia interface 102, a memory 104, a processor 106, and an output system 108.

As shown, in one embodiment, multimedia data 150 from the peripheral device 155 is passed through signal line 130a coupled to multimedia processing device 100 to multimedia interface 102 of multimedia processing device 100. As discussed throughout this application, the term "signal line" includes any connection or combination of connections supported by a digital, analog, satellite, wireless, firewire (IEEE 1394), 802.11, RF, local and/or wide area network, Ethernet, 9-pin connector, parallel port, USB, serial, or small computer system interface (SCSI), TCP/IP, HTTP, email, web server, or other communications device, router, or protocol. In certain cases, signal line facilitates bi-directional communication, or in other cases, may only support unidirectional communication. Signal line 130a, for instance, allows for data captured from peripheral device 155 to be transmitted to multimedia processing device 100, and also allows for command signals to change the orientation of peripheral device 155 to be sent to peripheral device 155 from multimedia processing device 100. Multimedia data 150 may be sourced from various peripheral devices including microphones, video cameras, sensors, and other multimedia capture or playback devices. Multimedia data 150 can also be sourced from a portable storage medium (not shown) such as a tape, disk, flash memory, or smart drive, CD-ROM, DVD, or other magnetic, optical, temporary computer, or semiconductor memory. In an embodiment, data 150 are accessed by the multimedia processing device 100 from a storage medium through various card, disk, or tape readers that may or may not be incorporated into multimedia processing device 100.

In an embodiment, multimedia data 150 are received over signal line 130*a* from multimedia data source or peripheral device 155. Alternatively, the data may be delivered over signal line 130*a* to multimedia interface 102 over a network from a server hosting, for instance, a database of multimedia files. Additionally, the multimedia data may be sourced from a receiver (e.g., a satellite dish or a cable receiver) that is configured to capture or receive (e.g., via a wireless link) multimedia data from an external source (not shown) and then provide the data to multimedia interface 102 over signal line 130*a*.

Multimedia data 150 are received through multimedia interface 102 adapted to receive multimedia data 150 from signal line 130*a*. Multimedia interface 102 may comprise a typical communications port such as a parallel, USB, serial, SCSI, Bluetooth™/IR receiver. It may comprise a disk drive, analog tape reader, scanner, firewire, IEEE 1394, Internet, or other data and/or data communications interface.

Multimedia interface 102 in turn supplies multimedia data 150 or a processed version of it to system bus 110. System bus 110 may represent one or more buses including an industry standard architecture (ISA) bus, a peripheral component interconnect (PCI) bus, a universal serial bus (USB), or some other bus known in the art to provide similar functionality. In an embodiment, if multimedia data 150 is received in an analog form, it is first converted to digital form for processing using a conventional analog-to-digital converter. Likewise, if the multimedia data 150 is a paper input, for instance video paper, multimedia interface 102 may contain bar code reading or optical character recognition (OCR) capabilities by which the multimedia data within the paper document can be accessed. Multimedia data 150 is sent in digitized form to system bus 110 of multimedia processing device 100.

In FIG. 1A, multimedia data 150 is delivered over signal line 130*a* to multimedia processing device 100. However, in other embodiments, multimedia data 150 may also be generated within multimedia processing device 100 and delivered to processor 106 by system bus 110. For instance, multimedia data 150 may be generated on multimedia processing device 100 through the use of movie making software, a video editor, or other similar multimedia tools (not shown). Once created on the multimedia processing device 100, a multimedia file can be sent along the system bus 110, to processor 106 or memory 104 for instance. In another embodiment, multimedia processing device 100 contains a digital multimedia recorder as the peripheral device 155 through which sound and/or images generated outside the multimedia processing device 100, for instance, can be recorded. Once captured, digital signals comprising the multimedia recording can then be further processed by the multimedia processing device 100.

Commands 190 to process or output multimedia data 150 may be transmitted to multimedia processing device 100 through signal line 130*b* coupled to multimedia processing device 100. In an embodiment, commands 190 reflect a user's specific conversion, processing, and output preferences. Such commands could include instructions to convert multimedia data 150 from an analog to digital format, or digital to analog, or from one digital format to another. Alternatively, commands 190 could direct processor 106 to carry out a series of conversions, or to index raw or processed multimedia data 150. In an embodiment, commands 190 specify where the processed multimedia data 150 should be output—for instance to a paper document 170, electronic data 180, portable storage medium, or the like. A specific set of commands sent over a signal line 130*b* to bus 110 in the form of digital signals instruct, for instance, that multimedia data 150 in a .mpeg format should be compressed to a smaller format and then bar coded, and the result burned to a CD.

In an embodiment, commands 190 to processor 106 instruct that the processed multimedia data 150 be output to a paper document 170. Preferably commands 190 describe the layout of the document 170 on the page, and are sent as digital signals over signal line 130*b* in any number of formats that can be understood by processor 106 including page description language (PDL), Printer Command Language (PCL), graphical device interface (GDI) format, Adobe's Postscript language, or a vector- or bitmap-based language. Communication protocols as disclosed in U.S. Patent Application entitled, "Printer With Embedded Retrieval and Publishing Interface," to Hull et. al, filed Mar. 30, 2004, Ser. No. 10/814, 536 or U.S. Patent Application entitled, "Printer With Document-Triggered Processing," to Hull et. al, filed Mar. 30, 2004, Ser. No. 10/814,580 each of which is hereby incorporated by reference in its entirety, for instance, could be used to facilitate PDL-based and other communications to the multimedia processing device 100. The instructions 190 also specify the paper source, page format, font, margin, and layout options for the printing to paper of multimedia data 150. Commands 190 could originate from a variety of sources including a print dialog on a processing device 160 coupled to multimedia processing device 100 by signal line 130*c* that is programmed to appear every time a user attempts to send multimedia data 150 to the multimedia processing device 100 for instance.

Alternatively, commands 190 in the form of responses provided by a user to a set of choices presented in a graphical user interface could be sent to processor 106 via a signal lines 130*b*, 130*c*, or 130*d*. Graphical interfaces such as the ones described in U.S. Patent Applications entitled "Printer User Interface," to Hart et. al, filed Mar. 30, 2004, Ser. No. 10/814, 700 or "User Interface for Networked Printer," to Hart et. al, filed Mar. 30, 2004, Ser. No. 10/814,500, each of which is hereby incorporated by reference in its entirety, could be used, for instance. A similar set of choices and responses could be presented by a hardware display, for instance through a touch screen or key pad hosted on a peripheral device 155 coupled to multimedia processing device 100 by a signal line 130*a* or incorporated as part of the multimedia processing device 100. The commands may be transmitted, in turn, to multimedia processing device 100 through signal line 130*b* connected to the peripheral device 155 or could be directly provided to multimedia processing device 100.

In yet another embodiment, conventional software hosted on a machine (not shown) could be adapted to solicit processing and output choices from a user and then send these to processor 106 on multimedia processing device 100. This software could be modified through a software plug-in, customized programming, or a driver capable of adding "print" options to multimedia rendering applications such as Windows Media Player. Various possible interfaces for controlling and managing multimedia data are further discussed in U.S. Patent Application entitled, "Multimedia Print Driver Dialog Interfaces," to Hull et. al, filed Mar. 30, 2004, Ser. No. 10/814,944.

Although processor 106 of multimedia processing device 100 of FIG. 1A is configured to receive processing commands 190 over a signal line 130*b*, as described above, in another embodiment of the invention, processing commands 190 are input or generated directly on multimedia processing device 100. In another embodiment, multimedia processing device 100 does not receive commands at all to process the multimedia data 150, but contains logic that dictates what steps should automatically be carried out in response, for instance, to receiving a certain kind of data 150. For instance, the multimedia processing device 100 could be programmed to convert every.mp3 or .wav file it receives to multimedia upon receipt, and then to store the resulting multimedia file to a server on a network accessed over signal line 130*d*.

As shown in FIG. 1A, multimedia processing device 100 receives multimedia data 150 and commands 190 over signal lines 130*a*, 130*b* and outputs processed multimedia data 150 as a paper document 170 or over signal line 130*d* as electronic data 180. Multimedia processing device 100 may be customized for use with multimedia data 150, and may contain various of the modules 200-216 displayed in FIG. 2 and assorted peripherals (such as an electronic keyboard, video recorder) (not shown) to generate multimedia data 150. As used herein, the term "module" can refer to program logic for providing the specified functionality that can be implemented in hardware, firmware, and/or software. In an embodiment, multimedia processing device 100 comprises a printing device that has the capability to generate paper outputs, and may or may not have the ability to generate electronic outputs as shown. As used herein, the term "printing device" or "printer" refers to a device that is capable of receiving multimedia data 150, has the functionality to print paper documents, and may also have the capabilities of a fax machine, a copy machine, and other devices for generating physical documents. Printing device may comprise a conventional laser, inkjet, portable, bubblejet, handheld, or other printer, or may comprise a multi-purpose printer plus copier, digital sender, printer and scanner, or a specialized photo or portable printer, or other device capable of printing a paper document. It may also comprise a specialized printing devices such as any of the devices disclosed in U.S Patent Applications "Printer with Multimedia Server" or "NEP Apparatus," both filed on Mar. 30, 2004, which are hereby each incorporated by reference in its entirety. In an embodiment, printing device comprises a conventional printer adapted to receive multimedia data, and/or to output electronic data.

Multimedia processing device 100 preferably comprises output system 108 capable of outputting data in a plurality of data types. For example, output system 108 preferably comprises a printer of a conventional type and a disk drive capable of writing to CDs or DVDs. Output system 108 may comprise a raster image processor or other device or module to render multimedia data 150 onto a paper document 170. In another embodiment, output system 108 may be a printer and one or more interfaces to store data to non-volatile memory such as ROM, programmable read-only memory (PROM), erasable programmable read-only memory (EPROM), electrically erasable programmable read-only memory (EEPROM), flash memory, and random access memory (RAM) powered with a battery. Output system 108 may also be equipped with interfaces to store electronic data 150 to a cell phone memory card, PDA memory card, flash media, memory stick or other portable medium. Later, the output electronic data 180 can be accessed from a specified target device. In an embodiment, output system 108 can also output processed multimedia data 150 over signal line 130*d* to an email attaching the processed multimedia data 150 to a predetermined address via a network interface (not shown). In another embodiment, processed multimedia data 150 is sent over signal line 130*d* to a rendering or implementing device such as a CD player or media player (not shown) where it is broadcast or rendered. In another embodiment, signal line 130*d* comprises a connection such as an Ethernet connection, to a server containing an archive where the processed content can be stored. Other output forms are also possible.

Multimedia processing device 100 further comprises processor 106 and memory 104. Processor 106 contains logic to perform tasks associated with processing multimedia data 150 signals sent to it through the bus 110. It may comprise various computing architectures including a reduced instruction set computer (RISC) architecture, a complex instruction set computer (CISC) architecture, or an architecture implementing a combination of instruction sets. In an embodiment, processor 106 may be any general-purpose processor such as that found on a PC such as an INTEL x86, SUN MICROSYSTEMS SPARC, or POWERPC compatible-CPU. Although only a single processor 106 is shown in FIG. 1A, multiple processors may be included.

Memory 104 in multimedia processing device 100 can serve several functions. It may store instructions and associated data that may be executed by processor 106, including software and other components. The instructions and/or data may comprise code for performing any and/or all of the functions described herein. Memory 104 may be a dynamic random access memory (DRAM) device, a static random access memory (SRAM) device, or some other memory device known in the art. Memory 104 may also include a data archive (not shown) for storing multimedia data 150 that has been processed on processor 106. In addition, when multimedia data 150 is first sent to multimedia processing device 100 via signal line 130*a*, the data 150 may temporarily stored in memory 104 before it is processed. Other modules 200-216 stored in memory 104 may support various functions, for instance to process, index, and store multimedia data. Exemplary modules in accordance with an embodiment of the invention are discussed in detail in the context of FIG. 2, below.

Although in FIG. 1A, electronic data output 180 is depicted as being sent outside multimedia processing device 100 over signal line 130*d*, in some embodiments, electronic data output 180 remains in multimedia processing device 100. For instance, processed multimedia data 150 could be stored on a repository (not shown) stored in memory 104 of multimedia processing device 100, rather than output to external media. In addition, multimedia processing device 100 may also include a speaker (not shown) or other broadcasting device. A multimedia card or other multimedia processing logic may process the multimedia data 150 and send them over bus 110 to be output on a remote speaker. Not every embodiment of the invention will include an output system 108 for outputting both a paper document 170 and electronic data 180. Some embodiments may include only one or another of these output formats.

Multimedia processing device 100 of FIG. 1A is configured to communicate with processing device 160. In an embodiment, multimedia processing device 100 may share or shift the load associated with processing multimedia data 150 with or to processing device 160. Processing device 160 may be a PC, equipped with at least one processor coupled to a bus (not shown). Coupled to the bus can be a memory, storage device, a keyboard, a graphics adapter, a pointing device, and a network adapter. A display can be coupled to the graphics adapter. The processor may be any general-purpose processor such as an INTEL x86, SUN MICROSYSTEMS SPARC, or POWERPC compatible-CPU. Alternatively, processing device 160 omits a number of these elements but at a minimum includes a processor and interface for communicating with multimedia processing device 100. In an embodiment, processing device 160 receives unprocessed multimedia data 150 over signal line 130c from multimedia processing device 100. Processing device 160 then processes multimedia data 150, and returns the result to multimedia processing device 100 via signal line 130c. Output system 108 on multimedia processing device 100 then outputs the result, as a paper document 170 or electronic data 180. In another embodiment, multimedia processing device 100 and processing device 160 share processing load or interactively carry out complementary processing steps, sending data and instructions over signal line 130c.

Figure 1B:
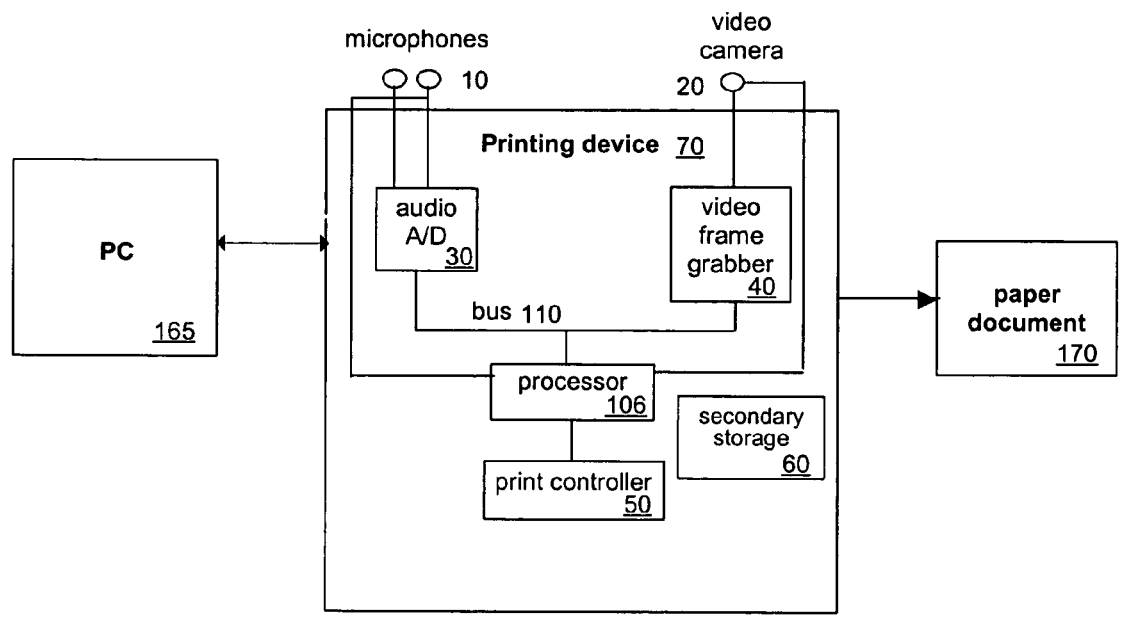
FIG. 1B illustrates a preferred configuration of a printer with audio/video localization in accordance with the present invention.

FIG. 1B illustrates a preferred embodiment of a multimedia printer with audio/video localization and includes a printing device 70, a pair of microphones 10, a video camera 20, a PC 165, and an exemplary output paper document 170. As shown, microphones 10 and video camera 20 feed directly into printing device 70. Data captured by microphones are passed over bus line to audio analog-to-digital converter 30; likewise, video data from video camera 20 can be fed into video frame grabber 40 that can isolate key frames from a stream of data. As shown, the connections between the peripheral devices 10, 20 and printing device to enable bi-directional communication, such that commands to tilt or adjust microphones 10 or tilt, pan, zoom or adjust video camera 20, for instance after localization has been performed by processor 106 on printing device 70 can be sent to peripheral devices 10 & 20. Carrying out these commands, peripheral devices 10 & 20 can then capture better quality data. Multimedia data or processing support can also be provided to or sourced from PC 165.

Figure 2:
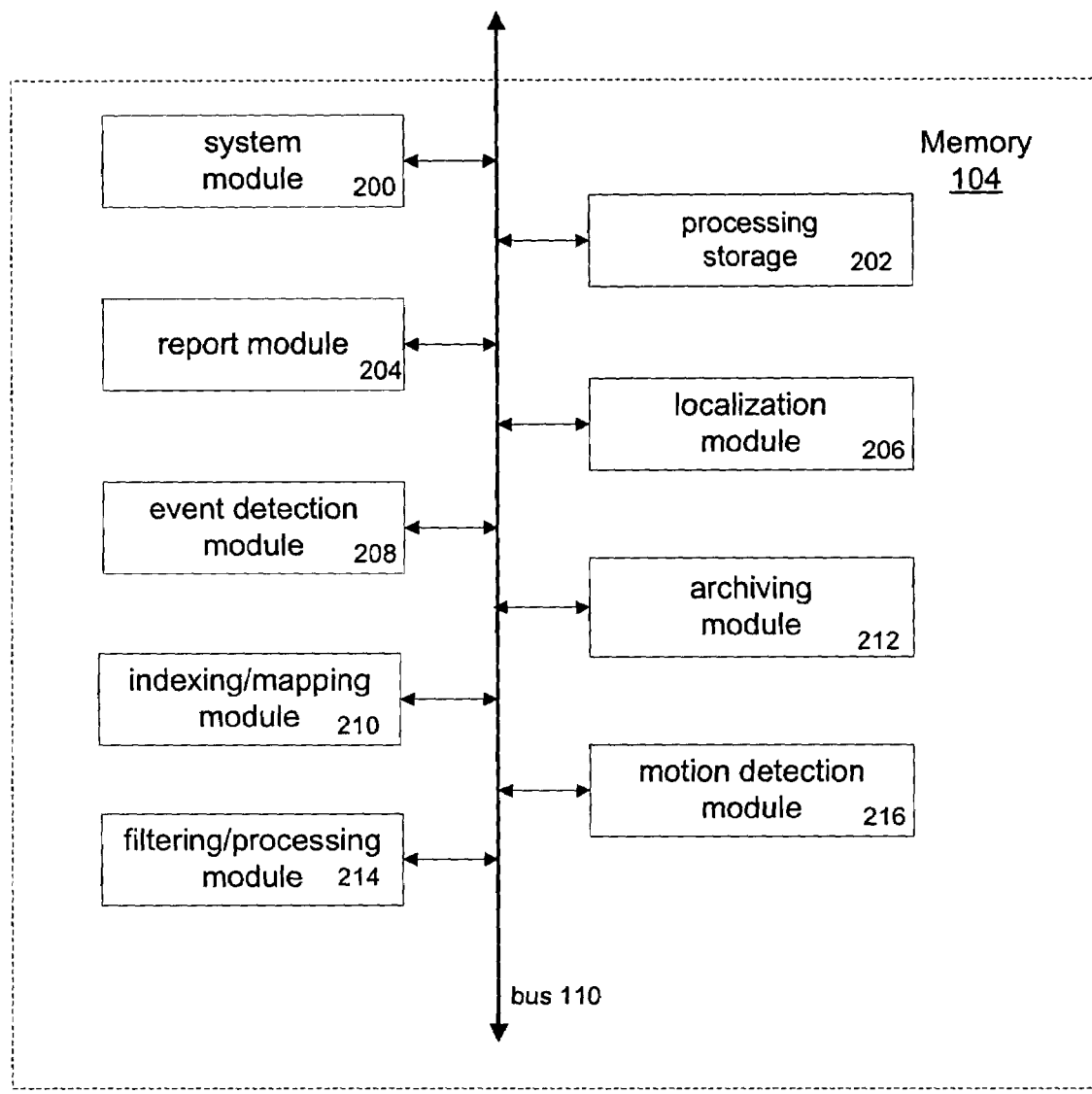
FIG. 2 is a block diagram of memory of the printer with audio/video localization of FIG. 1A in accordance with an embodiment of the invention.

FIG. 2 is a block diagram of memory 104 of the multimedia processing device 100 of FIG. 1A in accordance with an embodiment of the invention. Memory 104 is coupled to processor 106 and other components of multimedia processing device 100 by way of bus 110, and may contain instructions and/or data for carrying out any and/or all of the processing functions accomplished by multimedia processing device 100. In an embodiment, memory 104 as shown in FIG. 2 is hosted on processing device 160 of FIG. 1A, or another machine. Processor 106 of multimedia processing device 100 communicates with memory 104 hosted on processing device 160 through an interface that facilitates communication between processing device 160 and multimedia processing device 100 by way of signal line 130c. In addition, in embodiments of the invention certain modules 200-216 shown in memory 104 of FIG. 2 may be missing from the memory of multimedia processing device 100, or may be stored on processing device 160. Alternatively, additional modules may also be present.

Memory 104 is comprised of main system module 200, assorted processing modules 204-216 and processing storage 202 coupled to processor 100 and other components of multimedia processing device 100 by bus 110. Processing storage 202 is configured to store audio/video data at various stages of processing, and other data associated with processing. In the embodiment shown, processing storage 202 is shown as a portion of memory 104 for storing data associated with the processing of audio/video data. Those skilled in the art will recognize that processing storage 202 may include databases, subroutines, and other functionality, and may alternately be portions of the multimedia processing device 100 or processing device 160. Main system module 200 serves as the central interface between processing storage 202, the other elements of multimedia processing device 100, and modules 204-216. In various embodiments of the invention, main system module 200 receives input to process audio/video data, sent by processor 106 or another component via system bus 110. The main system module 200 interprets the input and activates the appropriate module 204-216. System module 200 retrieves the relevant data from processing storage 202 in memory 104 and passes it to the appropriate module 204-216. The respective module 204-216 processes the data, typically on processor 100 or another processor, and returns the result to system module 200. The result may then be passed to output system 108, to be output as a paper document 170 or electronic data 180.

In an embodiment, system module 200 contains logic to determine what series of steps, in what order, should be carried out to achieve a desired result. For instance, system module 200 may receive instructions from system bus 110 specifying that if a certain event occurs, then a series of actions should take place. System module 200 can parse these instructions to determine that it must monitor multimedia data for the event, and then when the event happens, that an event table containing various event triggers and their corresponding actions should be accessed. Based on information retrieved from the event table, system module 200 can initiate the requested action. System module 200 can carry out the action and other steps in the process by sending commands to the various modules described below to carry out these steps.

Filtering/processing module 214 is coupled to system module 200 and processing storage 202 by bus 110. System module 200, having received the appropriate input, sends a signal to filtering/processing module 214 to filter or process multimedia data 150 received by multimedia processing device 100 and save the result to processing storage 202. In one embodiment, filtering/processing module 214 is equipped with audio processing technology to filter out routine background noise or sounds, smooth data, enhance audio signals, returning the processed audio data to processing system 202. In another embodiment, filtering/processing module 214 uses a look-up table of pre-defined events to determine what events—for instance, the ring of a telephone at a certain frequency—should be left out of a summary of audio events. Similarly, in another embodiment, filtering/processing module 214 can also filter, smooth, or change video content that is received by multimedia processing device 100. Filtering/processing module 214 can, for instance, automatically adjust the contrast and tracking, or decrease the resolution of the image in order to allow the raw data to be saved in a more compact format. In yet another embodiment, filtering/processing module 214 includes voice recognition technology that can be used to distinguish speech from background noise. In another embodiment, multimedia data 150 is filtered such that periods of non-activity are deleted, and the processed file only contains periods of activity as defined by certain pre-determined parameters such as decibel level, shape of waveform, scene changes, or other measure. In an embodiment, filtering/processing module 214 can grab certain frames from video data, using conventional frame grabber technology, or can parse multimedia data to isolate only data "events" that match certain profiles.

Figure 3:
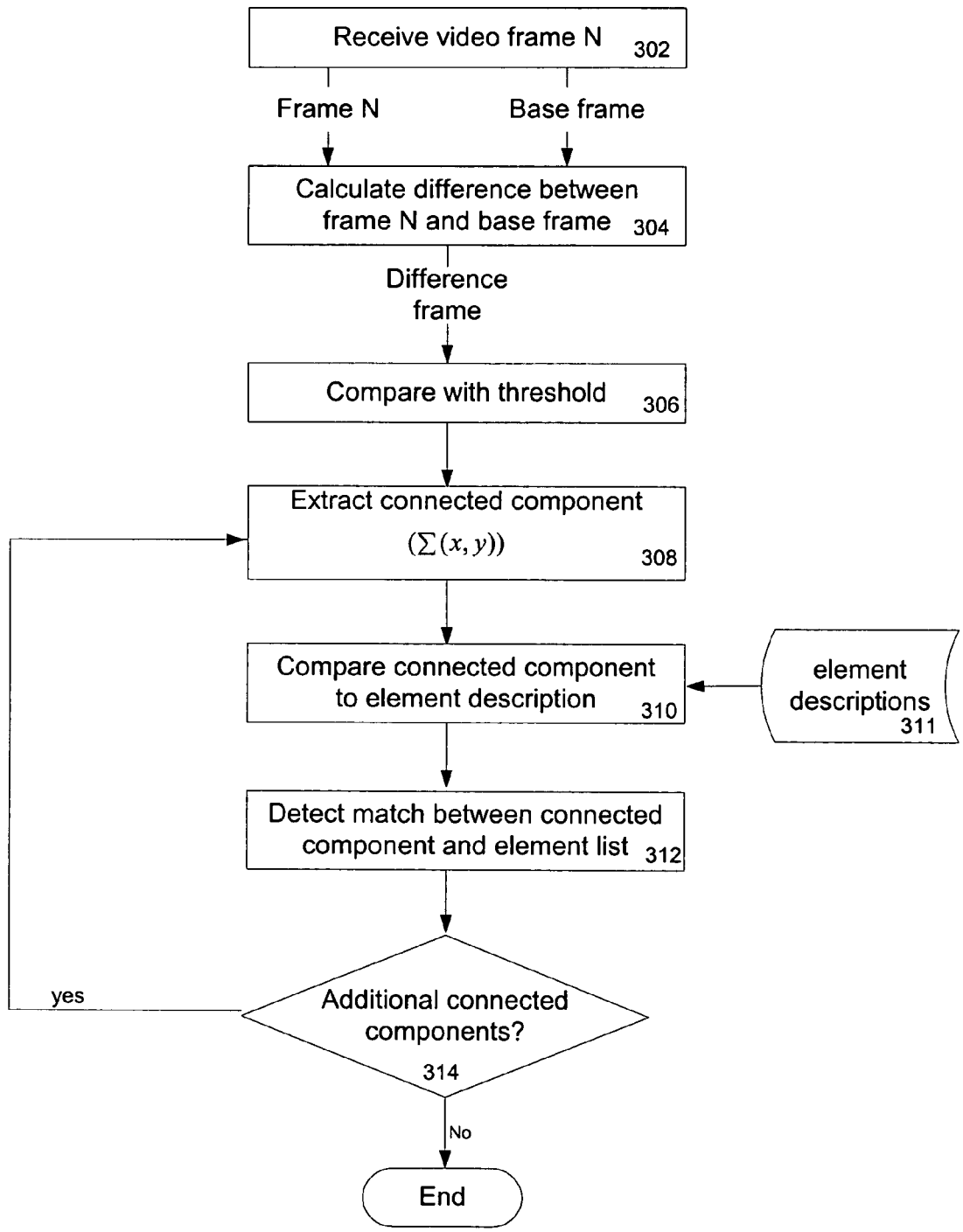
FIG. 3 shows the process flow of the operation of a printer with audio/video localization in accordance with an embodiment of the invention.

Motion detection module 216 is coupled to system module 200 and processing storage 202 by bus 110. System module 200, having received the appropriate input, sends a signal to motion detection module 216 to detect motion in video data. FIG. 3 depicts steps carried out in part by motion detection module 216 in one embodiment to process a video stream received by multimedia processing device 100. Performance of the steps depicted in FIG. 3 allows for motion detected by motion detection module 216 from video data to be compared against pre-existing elements supplied to multimedia processing device 100 by a user. The process begins when a frame of video data, frame N, is captured, for instance by a digital video recorder, at a resolution of 640 pixels by 480 pixels. Multimedia processing device 100 is coupled to the recorder and receives 302 a stream of the frames over signal line 130a. At regular intervals, a frame of video data captured by the video recorder is stored in processing storage 202 of memory 104 and is designated as the current base frame. As individual video frames are received, it is determined whether or not, based on a counter for instance, the received frame should replace the existing frame as the base frame. After multimedia processing device 100 receives frame N, system module 200 sends a command to motion detection module 216 to calculate 304 the difference between frame N and the current base frame. Motion detection module 216 takes frame N and the base frame and generates a pixel by pixel map of the differences between the two frames, the difference frame. The differences are compared 306 to a threshold value. Differences below the threshold are considered noise, however, changes at or are above the threshold indicate that "motion" has occurred. When motion has been detected, motion detection module 216 extracts 308 connected components by grouping adjacent pixel differences into "components" 308. Each connected component can then be characterized by dimensional size ($\Sigma$), and center location (x, y). The results are returned to system module 200. The system module 200 then instructs event detection module 208 to detect predetermined events that are reflected in the motion detected.

Returning to FIG. 2, event detection module 208 is coupled to system module 200 and processing storage 202 by bus 110. In an embodiment, a user has supplied a list of element descriptions 311 referenced in FIG. 3 to multimedia processing device 100 over bus line 130b, each of which describes an event in terms of sizes and locations, for instance a person standing in a doorway. Returning to FIG. 3, event detection module 208 compares 310 the connected components extracted from frame N to the element descriptions 311. Event detection module 208 detects 312 a match, for example, when it detects a proportional correlation between a detected component and an element description above a certain match threshold. The result is returned by bus line 110 to system module 200. If there are additional connected components 314, the process is repeated until no more connected components are identified. In an embodiment, event detection module 208 can use any of a number of conventional algorithms and processes to detect a range of multimedia event.

Returning to FIG. 2, in an embodiment, event detection module 208 uses audio feature analysis and recognition techniques which are commonly known in the art, for example those described in "Using Structure Patterns of Temporal and Spectral Feature in Audio Similarity," by Rui Cai, Lie Lu, Hong-Jiang Zhang, and Lian-Hong Cai, ACM Multimedia 2003, Berkeley, Calif., November 2-8, 219-222, to detect whether an event has happened. In another embodiment, event detection module 208 uses face detection algorithms such as those described in U.S. Patent Application entitled, "Multimedia Print Driver Dialog Interfaces," to Hull et. al, filed Mar. 30, 2004, Ser. No. 10/814,944, to determine when a certain person has appeared in a video frame. Similarly, event detection module 208 can be "trained" to recognize the events profiled in a lookup table. A profile of a phone ringing could be based on the direction from which a tone emanates, and the pitch, duration, and frequency of the tone for instance. The greater the match between profile and received multimedia data, the higher the confidence level that event detection module 208 has correctly identified the "event." Similarly, event detection module 208 can determine that a phone conversation has taken place when it detects a combination of the appropriate ring tone and one-way voice communication. In another embodiment, an office discussion may be identified by the presence of several elements including a video image of one or more persons within a confined space for at least a fixed duration of time and the presence of two or more voices captured by an audio device.

Figure 4:
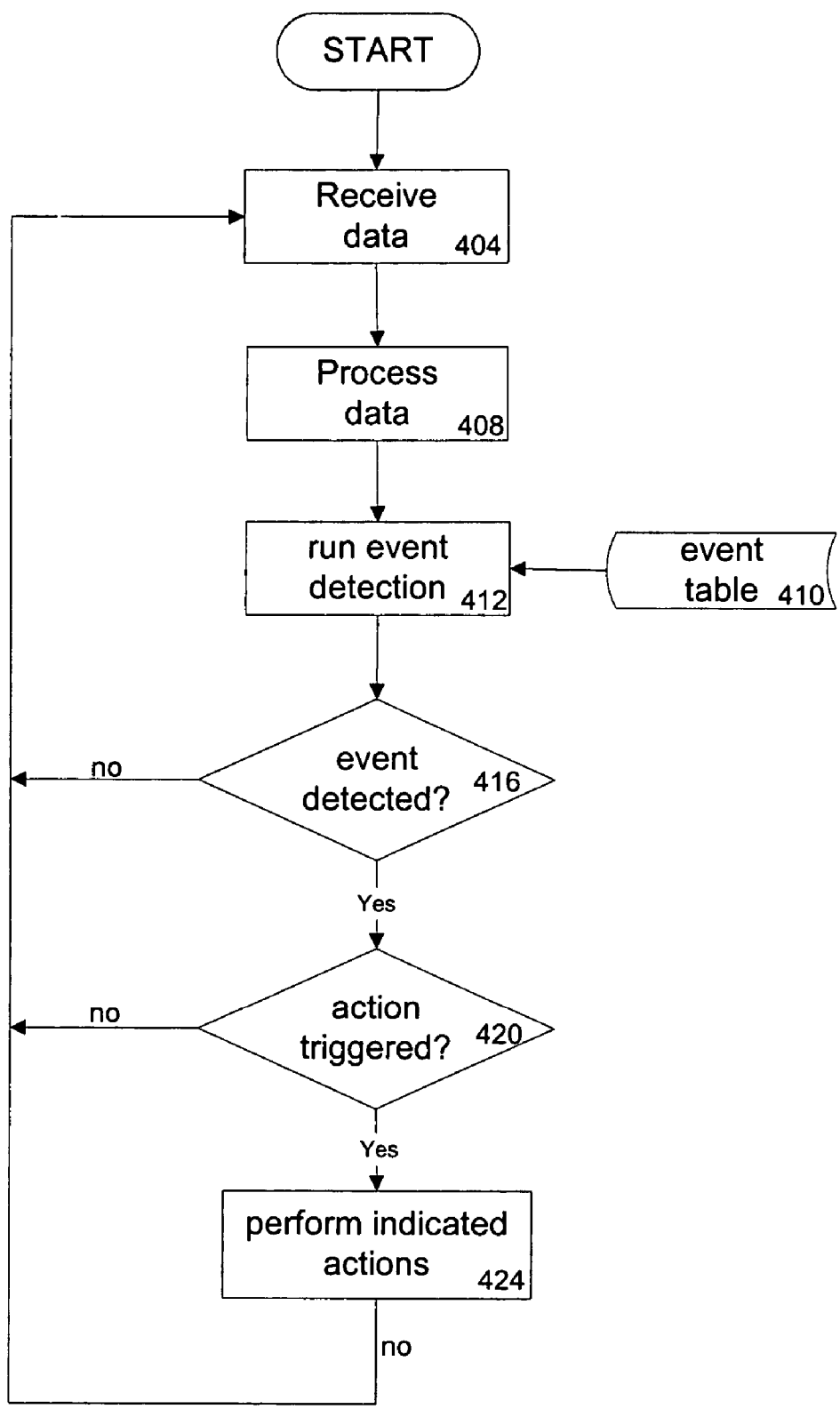
FIG. 4 depicts an exemplary process for event-triggered data processing in accordance with an embodiment of the invention.

Event direction module 208 can also be used to carry out event-triggered data processing. Steps in an exemplary process for event-triggered data processing are depicted in the flowchart of FIG. 4. Multimedia data is received 404 by multimedia processing device 100, and processed 408 by filtering/processing module 214. Event detection module 208 runs 412 event detection, preferably with reference to an event table 410 that stores descriptions and profiles of predetermined multimedia "events" and the actions they trigger, if any. If an event is detected 416, a further determination is made, based on the event table 410, as to whether or not the event has triggered 420 an action. This step could be carried out by system module 200 accessing event table 410 and processing storage 202. If an action has been triggered 420, system module 200 activates the appropriate module or modules 204-216 to carry out 424 the action associated with the event. Regardless of the outcome—if no event has been detected, or if no action has been triggered, or even if the indicated actions have been performed 424, multimedia processing device 100 continues to receive 404 and process 408 data, and run event detection 412 on the data.

Localization module 206 is coupled to system module 200 and processing storage 202 by bus 110. In an embodiment, system module 200, having received the appropriate input, sends a signal to localization module 206 to perform localization. In an embodiment, localization module 206 performs localization based on audio data received from a microphone array responsive to such a command from system module 200. The microphones are connected to multimedia processing device 100 through a network. As localization module 206 performs audio localization, multimedia processing device 100 commands the microphones to orient towards the source of a sound. The microphones are positioned in response to the command, thereby improving the quality of the audio data sent to multimedia processing device 100. In an embodiment, two pairs of microphones are placed in a fixed configuration around a meeting room. A first in first out (FIFO) buffer attached to each microphone receives audio samples at fixed intervals. The samples are sent in real-time to multimedia processing device 100 over signal line 130a, and are routed to processing storage 202. System module 200 directs localization module 206 to perform localization 604 based on the samples. To do this, localization module 206 calculates the time delay of arrival between each of the pairs of microphones based on the speed of sound and the physical distance between the microphones. It then calculates the offset that maximizes the correlation between each pair of samples. This information is used to estimate the direction from which the sound originated; that is, the point in space that yields maximum energy. Filtering/processing module 214 sends this information to system module 200, which then converts it into commands to mechanically reposition the microphone or microphones to point towards the source of the sounds. System module 200 sends these commands to output system 108, which sends them over signal line 130a back to the peripheral devices 155. This process is repeated for various samples.

In another embodiment, localization module 206 performs localization based on data captured by one or more of a visual sensor, stereo camera, video detection unit, and temperature sensor. Algorithms such as those described in "Person Tracking Using Audio-Video Sensor Fusion," by Neal Checka, Kevin Wilson & Vibhav Rangarajan of the Artificial Intelligence Laboratory of the Massachusetts Institute of Technology of Cambridge, Mass. to perform localization based on sets of data inputs may be used.

Indexing/mapping module 210 is coupled to system module 200 and processing storage 202 by bus 110. In an embodiment, system module 200, having received the appropriate input, sends a signal to indexing/mapping module 210 to map multimedia data 150 to a summary file or index. To carry out this instruction, indexing/mapping module 210 accesses multimedia data 150 through system bus 110. Indexing/mapping module 210, using or adapting any number of data mapping programs such as the Audition product offered by Adobe Systems Incorporated of San Jose, Calif. or any of the algorithms described in "Visualizing Multimedia Content on Paper Documents: Key Frame Selection for Video Paper," by Jonathan J. Hull, Berna Erol, Jamey Graham, Dar-Shyang Lee, 7th International Conference on Document Analysis and Recognition, 2003 (for key frame selection from video); "Portable Meeting Recorder," by Dar-Shyang Lee, Berna Erol, Jamey Graham, Jonathan J. Hull and Norihiko Murata, ACM Multimedia Conference, 2002 (for event detection from audio and video); and "Key frame selection to represent a video," by Dirfaux, F., IEEE International Conference on Image Processing 2000 (for key frame selection); each of which is hereby incorporated by reference in its entirety, can analyze multimedia data 150 and map it to a summary file for further analysis. In another embodiment, indexing/mapping module 210 segments multimedia data 150 by various measures including time interval, speaker during a meeting, scene change, or other multimedia cues and prepares an index that references each of the segments. In an embodiment, indexing/mapping module 210 creates a new file to store the map or index information generated, and sends the new file by system bus 110 to processing storage 202 to be stored. It may in an embodiment use an algorithm such as one described in "Multimodal Summarization of Meeting Recordings," by Berna Erol, Dar-Shyang Lee, and Jonathan J. Hull, IEEE International Conference on Multimedia and Expo, Baltimore, Md., July, 2003 to compute map or index information. Various techniques and interfaces for audio segmentation and audio mapping are discussed in more detail in U.S. Patent Application entitled, "Multimedia Print Driver Dialog Interfaces," to Hull et. al, filed Mar. 30, 2004, Ser. No. 10/814,944.

In an embodiment, indexing/mapping module 210 can also generate identifiers to correspond to segments of multimedia data such as barcodes. Conventional software, for instance provided by Barcode Software Center of Evanston, Ill., can be used or adapted to create a readable bar code that corresponds to the location of a specific segment of multimedia data for instance a phone call, a conversation between, or visitor at night to an office.

Report module 204 is coupled to system module 200 and processing storage 202 by bus 110. System module 200, having received the appropriate input, sends a signal to report module 204 to initiate the generation of a report based on multimedia data 150. The steps carried out by report module 204 will depend on the type of report requested. In an embodiment, for instance, multimedia processing device 100 receives a processing command 190 from a user to create a video paper document that presents on a piece of paper selected key video frames and bar codes positioned near the key frames to allow a user to play video beginning at the specific points in time referenced by the frames. Using video paper technology such as that described in "A Paper-based Interface for Video Browsing and Retrieval," Jamey Graham and Jonathan J. Hull, IEEE International Conference on Multimedia and Expo (ICME), Baltimore, Md., Jul. 6-9, 2003; or any of U.S. patent application Ser. No. 10/001,895, "(Video Paper) Paper-based Interface for Multimedia Information," filed Nov. 19, 2001; U.S. patent application Ser. No. 10/001,849, "(Video Paper) Techniques for Annotating Multimedia Information," filed Nov. 19, 2001; U.S. patent application Ser. No. 10/001,893, "(Video Paper) Techniques for Generating a Coversheet for a paper-based Interface for Multimedia Information," filed Nov. 19, 2001; U.S. patent application Ser. No. 10/001,894, "(Video Paper) Techniques for Retrieving Multimedia Information Using a Paper-Based Interface," filed Nov. 19, 2001; U.S. patent application Ser. No. 10/001,891, "(Video Paper) Paper-based Interface for Multimedia Information Stored by Multiple Multimedia Documents," filed Nov. 19, 2001; U.S. patent application Ser. No. 10/175,540, "(Video Paper) Device for Generating a Multimedia Paper Document," filed Jun. 18, 2002; and U.S. patent application Ser. No. 10/645,821, "(Video Paper) Paper-Based Interface for Specifying Ranges CIP," filed Aug. 20, 2003; each of which is each hereby incorporated by reference in its entirety can be used to generate the report.

Figure 5:
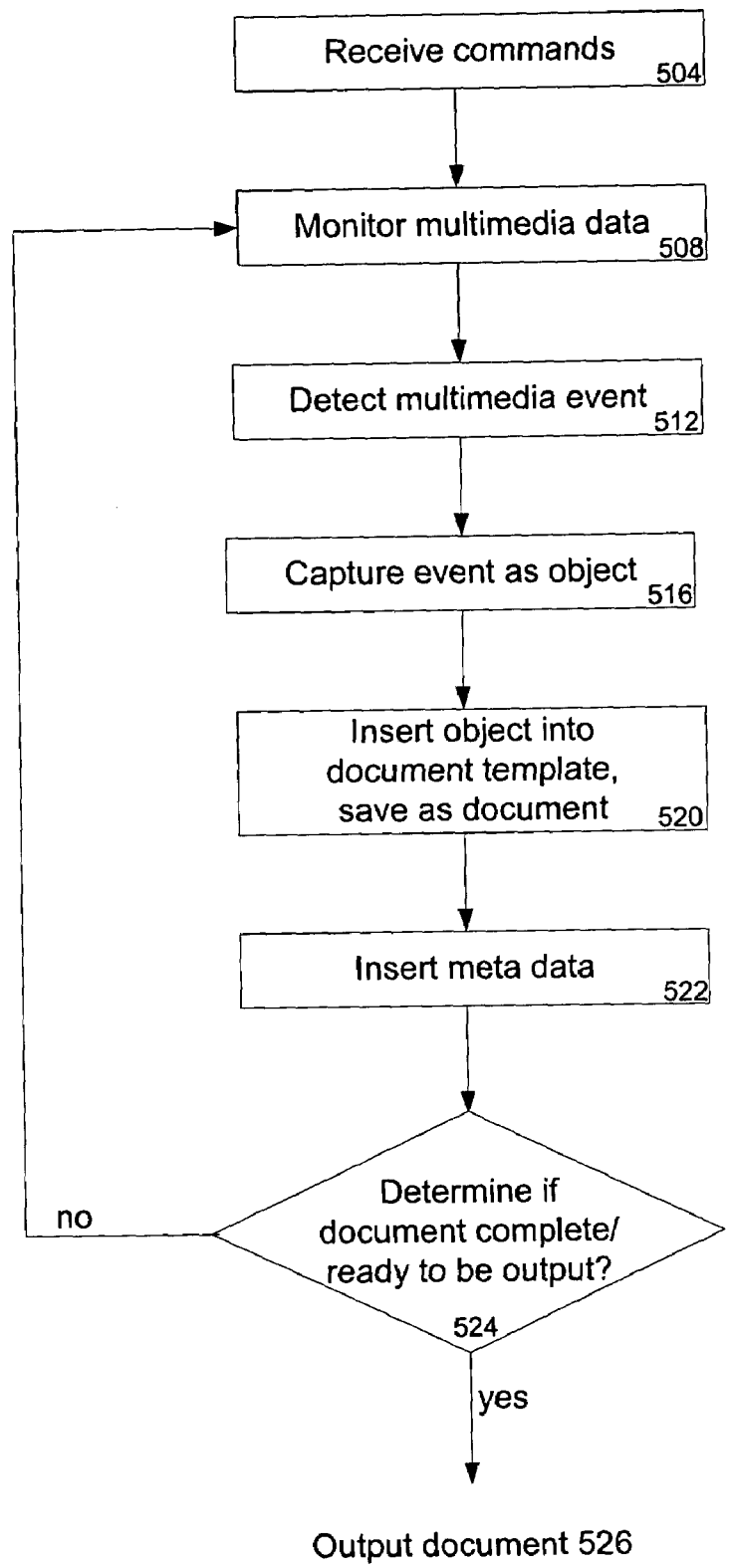
FIG. 5 shows a process flow for creating a report containing a multimedia object in accordance with an embodiment of the invention.

In another embodiment, report module 204 inserts multimedia objects as they are created into an existing document template that includes placeholders for objects that are predicted to occur in the future. The flow chart of FIG. 5 depicts one series of steps for completing this process that could be carried out in part by report module 204. First, a user sends processing commands 190 to processor 106 of multimedia processing device 100, over signal line 130b. As described above, these commands can be sourced from a graphical user interface on multimedia processing device 100, inputs to a print dialog, or another system for receiving user commands. The commands are received 504 by system module 200. They instruct multimedia processing device 100 to capture data at some future time or in response to some future event, convert the data into a multimedia object, and insert it into a document to be printed out. In an embodiment, system module 200 instructs report module 204 to generate a report template document based on the user's request. Taking advantage of the insert object function and a Microsoft Word plug-in, report module 204 could create a template document that includes placeholders for future multimedia data objects not yet in existence. In an embodiment, the template document could be prepared on the processor 106 of multimedia processing device 100; alternatively the task of creating the template document could be offloaded onto processing device 160 in communication with multimedia processing device 100 through signal line 130c. In another embodiment, a user, rather than multimedia processing device 100, creates the template document, in Microsoft Word. Using the insert object function, report module 204 could insert non-printing PDL comments into a file that detail the relevant events to be detected. The user sends the template document with embedded PDL comments over system bus 110 to multimedia processing device 100. The document is not printed until the specified data objects have been created and inserted into the template.

After multimedia processing device 100 receives 504 the commands, event detection module 208 monitors 508 the multimedia data, responsive to a request sent by system module 200. Event detection module 208 scans the multimedia data for the specific triggering events identified by the user. Once event detection module 208 detects 512 the event, it sends a signal over system bus 110 to system module 200 indicating that the specified event in multimedia data 150 has occurred. System module 200 proceeds to capture 516 the event as a multimedia object. As one example, anytime a "phone conversation" or "office discussion" is identified in a stream of multimedia data 150, identified according to an event table, for instance, report module 204 could save the event as a discrete object to processing storage 202 and send a signal to system module 200 indicating that a relevant object had been detected and captured. Report module 204, responsive to commands from system module 200, then inserts 520 the captured object into the report template saved to processing storage 202 and saves it as a document capable of being output. Report module 204 also inserts 522 meta data about the object, such as the date and time when it was created, into the document. At this point, system module 200 determines 524 whether or not the document is complete and is ready to be output. For instance, the document might contain placeholders for several multimedia data objects and not be considered complete until all of the placeholders are filled with objects. Alternatively, a document could be considered "complete" if it exceeds its time limit in a queue even if the designated event did not occur. If the document is not considered complete, monitoring 508, detection 512, capture 516, etc. continue. When the document is determined 524 to be complete, for instance because all of the placeholders in a template document have been filled, or because the monitoring period has elapsed, the document is output 526.

Returning to FIG. 2, archiving module 212 is coupled to system module 200 and processing storage 202 by bus 110. System module 200, having received the appropriate input, sends a signal to archiving module 212 to store multimedia data 150, or processed multimedia data 150, to an archive. The archive could be stored on the archiving module 212 or other location on multimedia processing device 100. In another embodiment, archiving module 212 can send the multimedia data 150 to output system, to be sent to a network over signal line 130*d* and saved on a remote server. In an embodiment, multimedia data 150 is saved to processing device 160, or another device.

Figure 6:
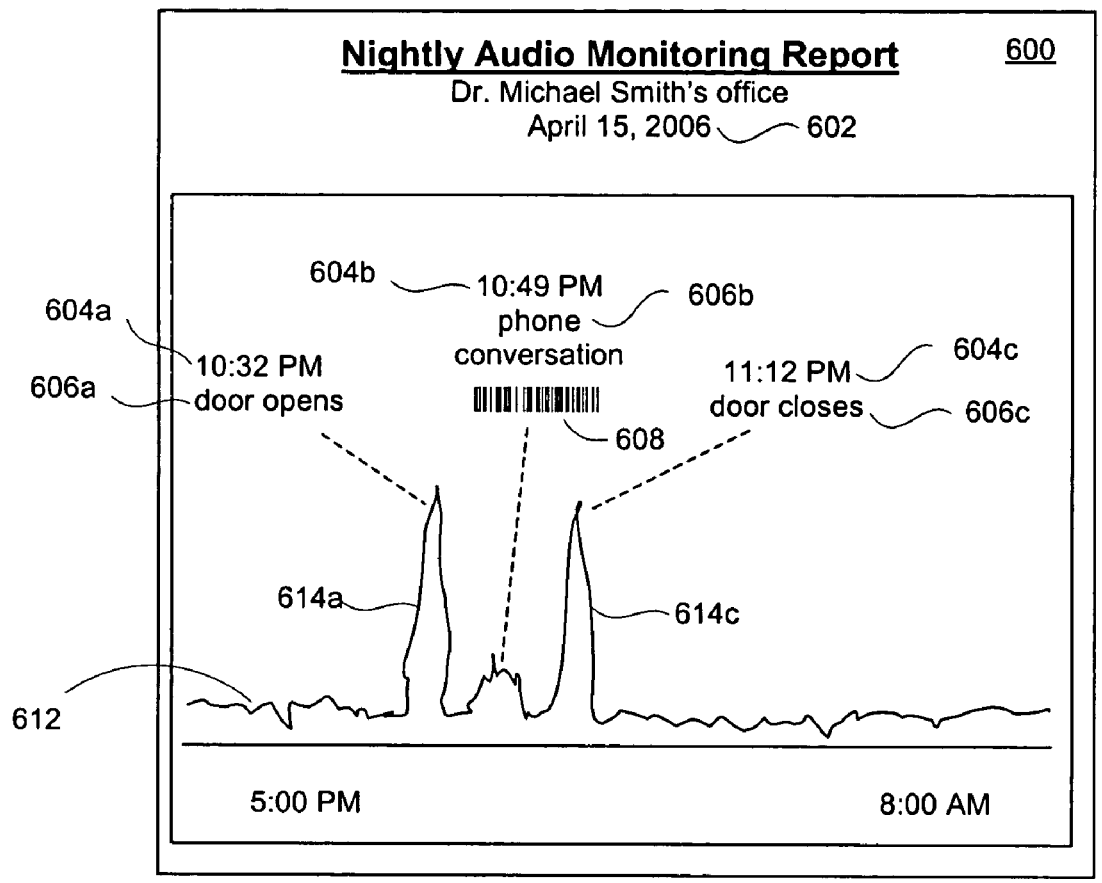
FIG. 6 depicts an exemplary output of a printer with audio/video localization in accordance with an embodiment of the invention.

FIG. 6 shows an exemplary paper output generated in by an embodiment of the invention of FIG. 1A. A report, "Nightly Audio Monitoring Report" 600, depicts a timeline 612 representing audio activity, in this case audio activity detected by a microphone installed in a doctor's office. In an embodiment, the microphone is installed in one room, and captures and streams audio data to the multimedia processing device 100 of FIG. 1A through a wireless connection. The microphones are constantly monitoring activity in the office, but as reflected in the timeline 612 the multimedia processing device 100 is programmed to only process data captured between 5 PM and 8 AM, the hours when there is no one in the office and there is a need for surveillance. During working hours, the microphones can be programmed to be shut off, or may send a data feed to the printer which is just serially deleted as soon as it fills up a temporary storage buffer. The raw audio sound is received by multimedia interface 102 from the microphones as it is being generated and is routed to processing storage 202 over system bus 110. Filtering/processing module 214, responsive to commands from system module 200, accesses the data from processing storage 202 and processes it, creating a new file that filters out identifiable regular sound events such as the central air supply turning on and off or background noise for instance produced by the hum of a computer fan. The filtered data is saved to a secure archive, either hosted by or multimedia processing device 100 or another device.

System module 200 then instructs event detection module 208 through signals sent over system bus 110 to process the filtered data and identify any events that took place. Event detection module 208 then scans the data for pre-identified sound forms associated with certain events. The pre-identified sound forms may be stored in a database in processing storage 202, populated by a system administrator based on a series of sound observations over a period of time. Each event is associated in the database with a short description, such as "door opens" and "door closes." Comparing the stored profiles to the audio data it receives, the event detection module 208 makes matches for several events—the beginning and end of a phone conversation and a door opening and closing. An index to the location of the events in the data is created, by indexing/mapping module 210. System module 200 receives the data from event detection module 208 that the beginning and the end of a phone conversation has been detected. System module 200 contains logic that instructs it to send a request to indexing/matching module 210 to create a bar code reference to the phone conversation.

Indexing/matching module 210 creates a readable bar code that corresponds to the location of the phone conversation in the archive, which identifies the beginning and end of the conversation, and links to the audio data. System module 200 then sends a request to report module 204 to generate the report 600. Report module 204 accesses a repository of report templates stored on processing storage 202 and selects the appropriate template, which already contains the name of the report as well as its layout, spacing, and other details. Report module 204 then takes the filtered raw data and maps it to a scaled timeline 612 in the report file. The events detected are exaggerated in size to allow the user to quickly identify that events have taken place. Report module 204 inserts the short description associated with each event stored in the event database next to the event 606*a*, and also identifies the time each event began 604. Dotted lines connecting the text to the graphical representation of the event are also included. A date stamp 602 reflecting the date of the report is included on the top of the report. A bar code 608 that points to the location of the conversation in the processed data file saved to the archive is inserted. Later, when someone wants to review the record of the conversation, they can use the barcode to access it, rather than having to manually locate the conversation within the 15 hours of tape, much of it containing just silence. The entire report is saved to processing storage 202. System module 200 sends it to output system 108 with a command to automatically send a printable copy of the report to a predesignated secure email address.

A user skilled in the art will know that FIG. 6 depicts just one of the many reports that could be generated by a multimedia printer or multimedia processing device 100. Other outputs are also possible. For instance, an abbreviated report could show only a record of events that happen, and omits periods of time when no activity is occurring. The data could be video data, and could be sourced from an optical disk to which it has been burned. In addition to using a template, report module 204 could also receive formatting instructions from system module 200 based on PDL comments sent with the data that can be read and processed by the multimedia data processor 110. Other outputs may be generated by multimedia processing device 100. In one embodiment, multimedia processing device 100 burns audio and video data to a rewritable CD (not shown) responsive to input provided by a user through a user interface. The CD contains both a compressed version of raw data received from audio and data feeds, and higher level reports.

In an embodiment, an administrator uses multimedia processing device 100 to streamline the process of detecting traffic violations and accidents at an intersection. A video camera is installed at an intersection and sends data though a monitoring network comprised of broadband wireline and wireless connections to multimedia processing device 100. Through a user interface on multimedia processing device 100, the user profiles the event it would like to monitor. The user specifies, for instance, that it would like reports of accidents that occur at the intersection to be printed out. In another embodiment, the user could direct photos to be taken of cars facing a certain direction that are in the intersection even when there is a red light. The user can choose the output it would like to see—for instance a snapshot image grabbed from the video data, or just a log of events indicating when there were apparent red light violations over a 72-hour period for instance. Finally, the user can use the interface to indicate how the data should be stored—for instance in a database or burned to disk. Multimedia processing device 100 receives these commands and applies them to the stream of video data it receives from the intersection. In one embodiment, an accident report is created every week that identifies the time of apparent violations occurring over a fixed period of time, and inserts snapshots taken of the violation event, preferably which capture a license plate view of each car. Once generated, the report is printed on paper to multimedia processing device 100.

Figure 7:
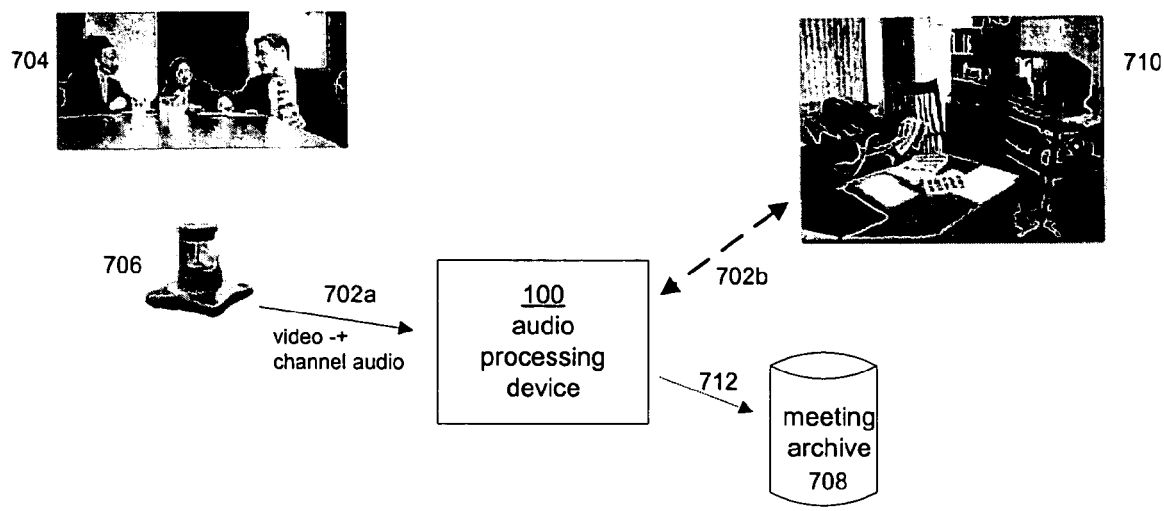
FIG. 7 depicts use of a printer with audio/video localization to facilitate a remote conference in accordance with an embodiment of the invention.

FIG. 7 depicts use of a multimedia processing device 100 to facilitate and record a remote conference. As shown, a meeting between several people takes place in an offsite location 704. A digital video camera 706 with four-channel audio capabilities is installed at one end of the room. Four separate microphones are installed at different locations throughout the room. During the meeting, video and audio data are streamed in real-time through signal line 702a over a dedicated connection from the camera and microphones 706 to multimedia processing device 100 as shown. This connection could be set up through a meeting technology such as Webex-.com. Multimedia processing device 100 receives the multimedia data, and routes the audio and video feed over signal line 702b, in this case, through an Ethernet connection, to an office 710 where the data are broadcast on a networked display in real-time. The participant observing the conference from her office 710 can, in an embodiment, participate in the meeting by calling in to the meeting and talking through a speakerphone in the meeting room 704. In another embodiment, a second video camera with microphone is installed in office 710, and the video feed generated by the second camera is sent to multimedia processing device 100, which in turn, routes it to a display in remote meeting room 704. While multimedia processing device 100 facilitates the conference, in an embodiment it also records portions of the meeting. It could, for instance, initiate and stop recording responsive to a meeting participant using a clicker to designate an important part of the meeting that she would like recorded. The clicker could be connected to multimedia processing device 100 through a separate connection that also travels over signal line 702a or 702b. Techniques, methods, and apparati of signaling meeting attendee interest and determining events based on interest data such as those described in U.S. Patent application Ser. No. 10/754,907, "Generating and Displaying Level-Of-Interest Values", filed Jan. 9, 2004, may also be used. In another embodiment, the entire meeting is automatically recorded and archived to meeting archive 708, accessible over a network 712 or another network lined to a user for a period of time. If no one attempts to access the archive 708 or designate it to be kept, it is deleted after the period of time has expired. In an embodiment, meeting participants identify themselves and the meeting at the beginning of each meeting. An index to meetings could include the date, time, and duration of the meeting as well as a link to the first two minutes of video so that a user can easily recall the content and time of the meeting.

Figure 8:
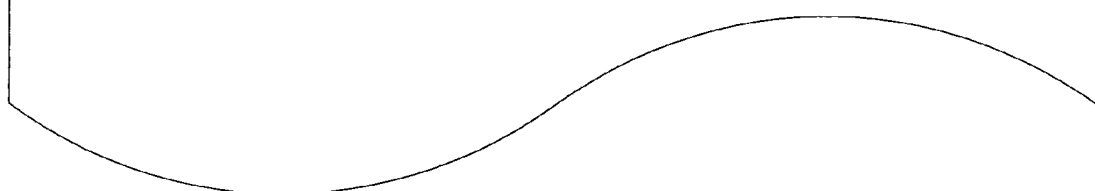
FIG. 8 shows an event table for use in accordance with an embodiment of the invention.

As described above, embodiments of the present invention make it easier to handle raw multimedia data and to transform the data into a useful output that can be integrated into a paper-based or other existing workflow. In an embodiment, the invention allows a user to define and specify events in terms of multimedia data. Based on the user's descriptions, multimedia processing device 100 can detect events in the data it receives and perform specific actions triggered by the events. FIG. 8 depicts an example of an event table 800 that matches events to actions in this way. As shown, the event table stores descriptions of multimedia "events." The descriptions are preferably expressed in a multimedia data metric, for instance, the dimensional size ($\Sigma$) and center location (x, y) of an image on a video frame, but can be in a variety of forms that allow for the identification of the event in multimedia data. The event table can be implemented in the form of a database, series of statements in a programming language, XML document, or for simple algorithms, in the form of a simple table or series of data strings. If an event is detected, in the event table of FIG. 8, an event counter is updated, for instance through a special purpose application in the print driver or a web browser interface using a cgi script. The event is associated with an action, triggered when a certain number of events have occurred.

In an embodiment of the invention, a printer equipped with motion detection capabilities could be programmed to sound a ring tone of a specific frequency whenever a paper was removed from a specific paper tray. As shown in FIG. 8, a user could specify the ringing of a paper tray tone as an event, based on its specific frequency and duration. Every day, a report could be generated that disclosed the number of times a document was removed from a tray and sent to an office administrator. A user could program the counter to be reset whenever the report was sent. Another event specified in FIG. 8 is a discussion in an office. Algorithms such as the one described above could be used to determine this event. Each time the event is detected, the action of recording the discussion and archiving it to a specific discussion server is triggered or set in motion. A third event comprises a telephone ring. Each time the event of the telephone ring is detected, another event detection is triggered, the event of detecting a voice. As specified in event table 800, if a voice is detected, the action of recording the voice until the call is complete is triggered. The three examples provided in the table are just a few of any number of event, action triggers, and action combinations of varying complexity that could be specified.

Figure 9:
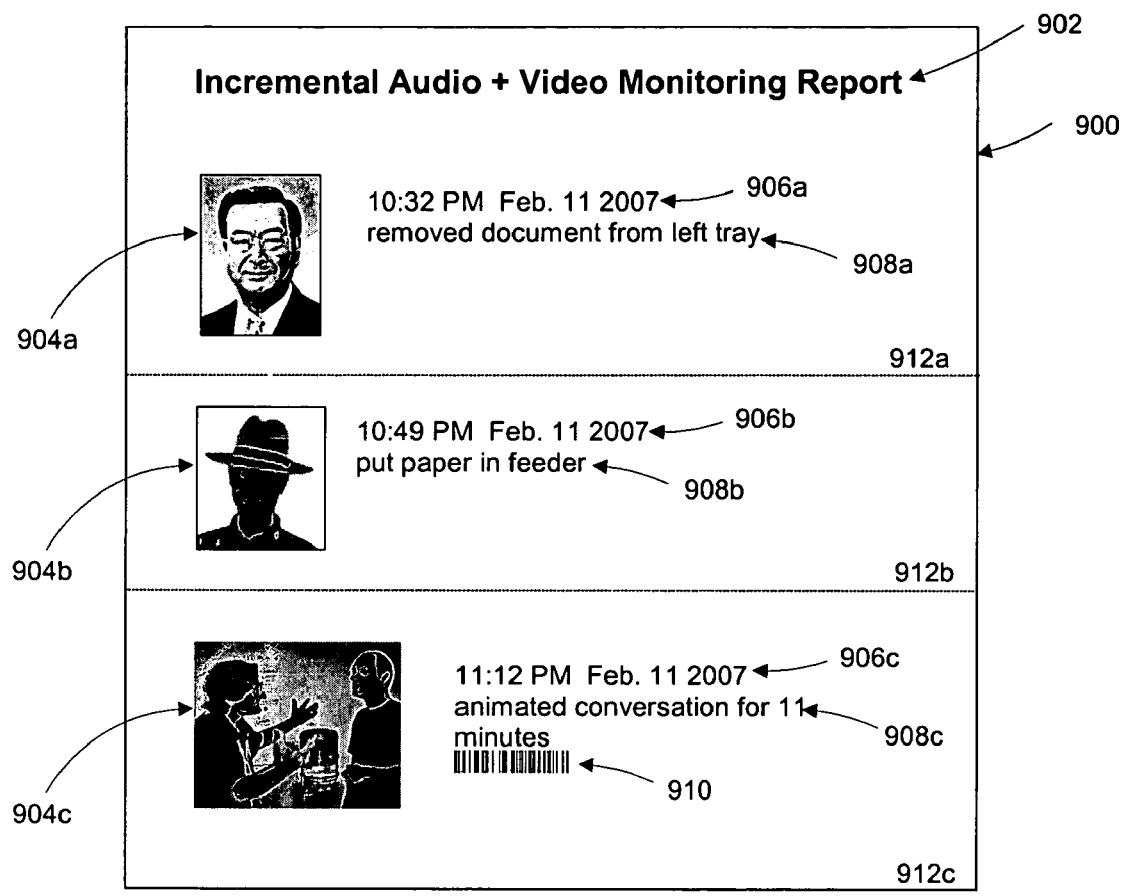
FIG. 9 shows an exemplary output including a multimedia object output by a printer with audio/video localization in accordance with an embodiment of the invention.
Figure 10:
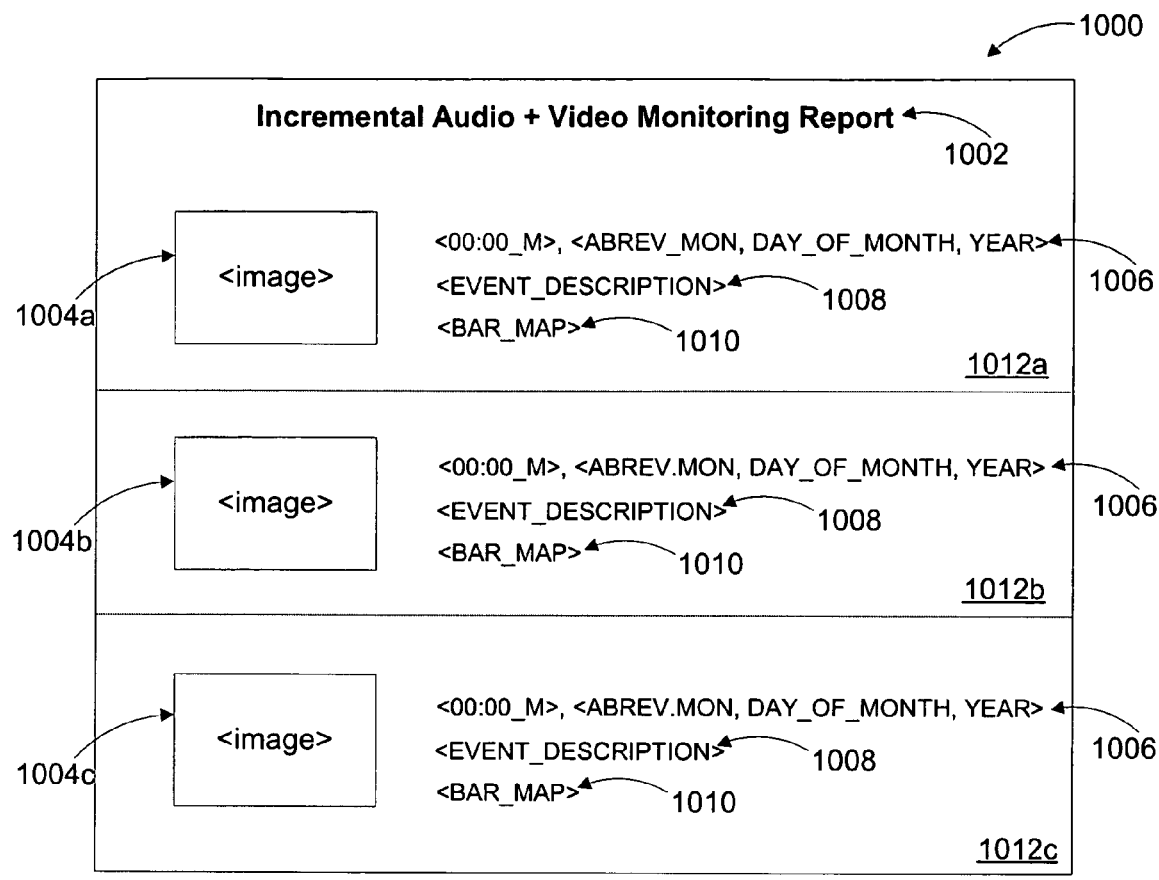
FIG. 10 depicts an exemplary template for use in generating the output of FIG. 9 in accordance with an embodiment of the invention.

FIG. 10 depicts a report template document 1000 for use in generating a report by multimedia processing device 100 based on the monitoring of audio and video data. FIG. 9 shows the completed report 900 as populated by multimedia objects inserted into the template. As shown in FIG. 10, template document 1000 comprises three sections 1012 for the insertion of audio and video monitoring events. The name of the report, "Incremental Audio and Video Monitoring Report" 1002 is provided at the top of the template document 1000. Each of the three sections 1012 contains a placeholder for the time and date 1006, event description 1008, and a bar code identifier 1010 to be populated in the case of certain events. In addition, a placeholder for an image 1004 corresponding to each of the events is placed on the left side of each section 1012. The report is based on a table that identifies what events should be reported, a description of the event, and what action based on the event should be carried out if the event is detected. In this case, the events comprise events around a printer including removing a document from a paper tray, putting paper into a feeder, and a conversation around a printer.

Multimedia processing device 100 receives audio and video data feeds, and event detection module 208 looks for each of the specified events in the data. A first event is detected, the removal of a document from a tray. The first report section 1012a is populated with the date and time of the event 906 and a description of the event as it appears in the lookup table 908a. The action associated with the event in the table is to identify the person who performed the event. Filtering/processing module 214 of multimedia processing device 100 grabs an image from the relevant video feed and event detection module 208 performs face recognition analysis, matching the face that appears on the feed to a database of faces stored on an archive. It finds a match for an employee, and retrieves a pre-existing photograph of the employee. Report module 204 then inserts this identifying picture is then inserted into placeholder in the template document 904a. A similar process of event detection, followed by the insertion of meta data about the event, the performance of face recognition on video data, and the insertion of a stock photo of an identified employee is repeated to produce the output of the second section 912b. The third section 912c reflects a slightly different event, the event of a conversation between two employees. The detection of the event by event detection module 208 triggers the capture of the conversation, and the creation of a bar code index to the event by indexing/mapping module 210 to be inserted in the third section 912c. At the same time, rather than inserting a stock photo, report module 204 inserts a frame 904c that has been grabbed from the video feed by filtering/processing module 214. The completed report 900 is sent to a printer to be output.

The foregoing description of the embodiments of the invention has been presented for the purpose of illustration; it is not intended to be exhaustive or to limit the invention to the precise forms disclosed. For example, any number of functionalities disclosed and hardware or software required to carry out these functionalities could be added to a conventional printer. Modifying an already existing network of printers to include multimedia monitoring and processing capabilities disclosed could create a minimally intrusive monitoring network and at a minimal additional cost. Persons skilled in the relevant art can appreciate that many modifications and variations are possible in light of the above teachings. It is therefore intended that the scope of the invention be limited not by this detailed description, but rather by the claims appended hereto.

We claim:

1. A method, comprising:
    receiving multimedia data by a multimedia printer for outputting a document;
    processing the multimedia data, by the multimedia printer, to identify at least one multimedia event in the multimedia data and generate a continuous timeline of the multimedia data;
    associating the multimedia event with a location in the timeline; and
    outputting, by the multimedia printer, a graphical representation of the timeline, wherein the graphical representation comprises a representation of the at least one identified multimedia event.

2. The method of claim 1, wherein the multimedia data is one from a group of audio data and video data.

3. The method of claim 1, wherein the multimedia data is a multimedia data stream.

4. The method of claim 1, wherein the multimedia data is received from a network.

5. The method of claim 1, wherein the multimedia data is received from a storage device.

6. The method of claim 1, wherein the step of processing the multimedia data further comprises:
    identifying a pre-determined multimedia event in the multimedia data.

7. The method of claim 6, further comprising:
    performing an action if the pre-determined multimedia event is identified.

8. The method of claim 6, further comprising:
    performing an action associated with the multimedia event in an event table if the pre-determined multimedia event is identified.

9. The method of claim 1, wherein the step of receiving includes receiving the multimedia data in an analog format; and the method further comprises:
    converting the multimedia data from the analog format to a digital format.

10. The method of claim 1, wherein the step of outputting the processed multimedia data is performed by writing the processed multimedia data to an archive file.

11. The method of claim 1, wherein the processed multimedia data comprises a representation of the multimedia data received by the multimedia printer.

12. The method of claim 1, wherein the step of outputting the processed multimedia data includes outputting portions of the multimedia data as video paper.

13. The method of claim 1, wherein the step of outputting the processed multimedia data includes printing portions of the multimedia data as a paper document.

14. The method of claim 1, wherein the step of outputting the processed multimedia data includes storing portions of the multimedia data to a sewer from which the processed multimedia data can be accessed and displayed.

15. The method of claim 1, wherein the multimedia data is video data, and wherein the step of processing the multimedia data includes capturing a video frame from the video data and saving it to a file.

16. The method of claim 1, wherein the step of outputting further comprises saving the processed multimedia data to a storage medium and indexing the processed data.

17. The method of claim 1, wherein the multimedia data is audio data, and further comprising:
    transcribing the audio data into text and wherein the step of outputting the processed multimedia data comprises outputting the text.

18. A method for capturing data, the method comprising:
    receiving, by a multimedia printer, multimedia data captured by a peripheral device;
    processing the multimedia data to generate a control signal, identify at least one multimedia event in the multimedia data, and generate a continuous timeline of the multimedia;
    associating the multimedia event with a location in the timeline;
    outputting, by the multimedia printer, a graphical representation of the timeline, wherein the graphical representation comprises a representation of the at least one identified multimedia event; and
    transmitting the control signal to the peripheral device.

19. The method of claim 18, wherein the step of processing the multimedia data comprises performing localization; and the control signal is for orienting the peripheral device in order to improve monitoring quality.

20. The method of claim 19, wherein the step of processing the multimedia data comprises performing audio localization; and the control signal controls orientation of at least one microphone.

21. The method of claim 19, wherein the step of processing the multimedia data comprises performing video localization; and the control signal controls orientation of a video capture device.

22. A method, comprising:
receiving multimedia data by a multimedia printer for outputting a document;
processing the multimedia data with the multimedia printer to identify at least one multimedia event in the multimedia data and generate a continuous timeline of the multimedia data;
associating the multimedia event with a location in the timeline; and
storing the processed multimedia data and generated timeline in the multimedia printer for later access.

23. A method, comprising:
receiving multimedia data by a multimedia printer;
processing the multimedia data, by the multimedia printer, to identify at least one multimedia event in the multimedia data and generate a continuous timeline of the multimedia data;
associating the multimedia event with a location in the timeline; and
outputting a graphical representation of the timeline, wherein the graphical representation comprises a representation of the at least one identified multimedia event through an interface on the multimedia printer wherein the multimedia printer is configured to output the processed multimedia data in paper-based and electronic formats.

24. The method of claim 23, wherein the step of outputting the processed multimedia data includes saving the processed multimedia data to a storage medium and indexing the processed data.

25. The method of claim 23, further comprising
receiving by the multimedia printer a command to process the multimedia data and to perform an action responsive to a multimedia event;
detecting the multimedia event in the multimedia data; and
executing the command responsive to detection of the multimedia event.

26. The method of claim 25, wherein the step of receiving by the multimedia printer the command comprises receiving an event table having a plurality of events and a plurality of corresponding actions.

27. The method of claim 23, further comprising outputting the processed multimedia data to a server from which the processed multimedia data can be accessed.

28. The method of claim 23, wherein the processed multimedia data comprises a portion of the multimedia data received by the multimedia printer.

29. A printing device, comprising:
a printer;
an interface adapted to receive multimedia data;
a processor for processing multimedia data received by the interface to identify at least one multimedia event in the multimedia data and generate a continuous timeline of the multimedia data, the processor coupled to the interface and to the printer;
a report module for associating the multimedia event with a location in the timeline;
a memory for storing processed multimedia data and from which the processed multimedia data can be accessed after its creation, the memory coupled to the processor; and
an output module for outputting a graphical representation of the timeline, wherein the graphical representation comprises a representation of the at least one identified multimedia event.

30. The apparatus of claim 29, farther comprising an output system for outputting the multimedia data.

31. An apparatus, comprising:
an interface adapted to receive multimedia data;
a processor for processing multimedia data coupled to the interface to identify at least one multimedia event in the multimedia data and generate a continuous timeline of the multimedia data;
a report module for associating the multimedia event with a location in the timeline; and
an output system, coupled to the processor, for outputting a graphical representation of the timeline, wherein the graphical representation comprises a representation of the at least one identified multimedia event generated by the processor, the output system for outputting data in a plurality of formats.

32. The apparatus of claim 31 wherein the output system is configured to output processed multimedia data to one of the group of a paper document and electronic data.

33. The apparatus of claim 31 wherein the output system is configured to output processed multimedia data to a paper document and electronic data.

34. The apparatus of claim 31, further comprising an indexing/mapping module for mapping contents of the multimedia data to a second file, the indexing/mapping module coupled to the processor.

35. The apparatus of claim 31, further comprising an archiving module for storing processed multimedia data for future access by a user, the archiving module coupled to the processor.

36. The apparatus of claim 31, further comprising a localization module for generating positioning commands for a peripheral device to improve capture of multimedia data from the peripheral device, the localization module coupled to the processor.

37. The apparatus of claim 31, further comprising an event detection module for determining whether a multimedia data event has occurred, the event detection module coupled to the processor.

38. The apparatus of claim 31, wherein the event detection module uses a event table to determine whether or not an event has occurred and an action is associated with the event.

* * * * *

UNITED STATES PATENT AND TRADEMARK OFFICE
CERTIFICATE OF CORRECTION

PATENT NO. : 7,415,670 B2  Page 1 of 1
APPLICATION NO. : 10/813946
DATED : August 19, 2008
INVENTOR(S) : Jonathan J. Hull, Berna Erol and Peter E. Hart It is certified that error appears in the above-identified patent and that said Letters Patent is hereby corrected as shown below:

Column 20, line 35, delete "sewer," insert --server--.

Signed and Sealed this

Twenty-eighth Day of October, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,415,670 B2 | Page 1 of 1 |
| APPLICATION NO. | : 10/813946 | |
| DATED | : August 19, 2008 | |
| INVENTOR(S) | : Jonathan J. Hull, Berna Erol and Peter E. Hart | |

It is certified that error appears in the above-identified patent and that said Letters Patent is hereby corrected as shown below:

On the Title Page Item (63) after the last CIP under "Related U.S. Application Data"

insert --Application No. 10/175,540 filed on Jun. 18, 2002, now Pat. No. 7,215,436, and a continuation-in-part of Application No. 10/645,821 filed on Aug. 20, 2003.--

Signed and Sealed this

Seventeenth Day of February, 2009

JOHN DOLL
*Acting Director of the United States Patent and Trademark Office*